(12) United States Patent
Lafleur

(10) Patent No.: US 10,856,650 B2
(45) Date of Patent: Dec. 8, 2020

(54) SCRATCH-FREE SNOW REMOVAL TOOL

(71) Applicant: ANDRE LAFLEUR RD& D INC., Boucherville (CA)

(72) Inventor: Andre Lafleur, Boucherville (CA)

(73) Assignee: André Lafleur RD&D Inc., Boucherville (CA)

( * ) Notice: Subject to any disclaimer, the term of this patent is extended or adjusted under 35 U.S.C. 154(b) by 121 days.

(21) Appl. No.: 16/372,555

(22) Filed: Apr. 2, 2019

(65) Prior Publication Data

US 2019/0328125 A1    Oct. 31, 2019

Related U.S. Application Data

(60) Provisional application No. 62/663,527, filed on Apr. 27, 2018.

(51) Int. Cl.
*A47L 1/06*  (2006.01)
*B60S 3/04*  (2006.01)
*A46B 15/00*  (2006.01)

(52) U.S. Cl.
CPC ............ *A46B 15/0081* (2013.01); *A47L 1/06* (2013.01); *B60S 3/045* (2013.01); *A46B 2200/3046* (2013.01)

(58) Field of Classification Search
CPC ......... A46B 15/0081; A47L 1/06; B60S 1/02; B60S 3/04; B60S 3/045; E01H 5/02
USPC ...................................... 15/236.02
See application file for complete search history.

(56) References Cited

U.S. PATENT DOCUMENTS

| 1,511,073 | A | * | 10/1924 | Gampher | E01H 5/02 |
| | | | | | 37/267 |
| 4,317,250 | A | | 3/1982 | Shutts | |
| 4,939,807 | A | * | 7/1990 | Hencz | A47L 1/06 |
| | | | | | 15/105 |
| 7,343,637 | B2 | * | 3/2008 | Lafleur | A46B 7/04 |
| | | | | | 15/105 |
| 9,221,432 | B2 | | 12/2015 | Blouin | |
| 9,521,900 | B2 | | 12/2016 | Kunnas et al. | |
| 9,580,050 | B2 | | 2/2017 | Opatrny | |
| 2011/0188923 | A1 | * | 8/2011 | Lafleur | A46B 15/0081 |
| | | | | | 403/53 |
| 2016/0029782 | A1 | | 2/2016 | Moghbel | |

FOREIGN PATENT DOCUMENTS

| CA | 1141910 | | 3/1983 |
| CA | 2727861 | | 7/2012 |
| CA | 2836166 | | 6/2014 |
| CA | 2 554 811 | * | 3/2016 |
| CA | 2908192 | | 4/2016 |
| CA | 2931857 | | 12/2016 |

* cited by examiner

*Primary Examiner* — Randall E Chin
(74) *Attorney, Agent, or Firm* — Benoit & Cote, Inc.; C. Marc Benoit; Charles-Andre Caron

(57) ABSTRACT

There is described a scratch-free snow removal tool comprising a flexible blade presenting a sweeping surface extending in a plane. The flexible blade defines a blade edge which is continuous and can be made of silicone or TPE. The blade support is more rigid than the flexible blade. A plurality of fingers is provided, which are more rigid than the flexible blade and extend in the plane of the sweeping surface, from the blade support toward the blade edge without reaching the blade edge.

18 Claims, 25 Drawing Sheets

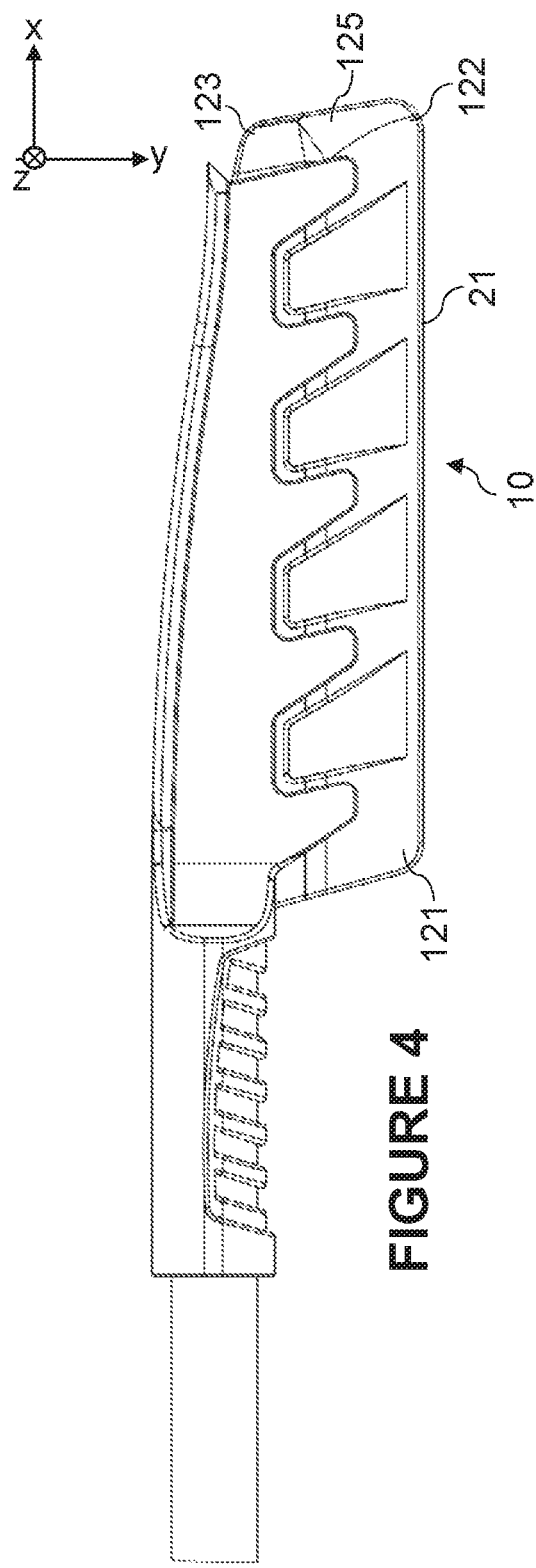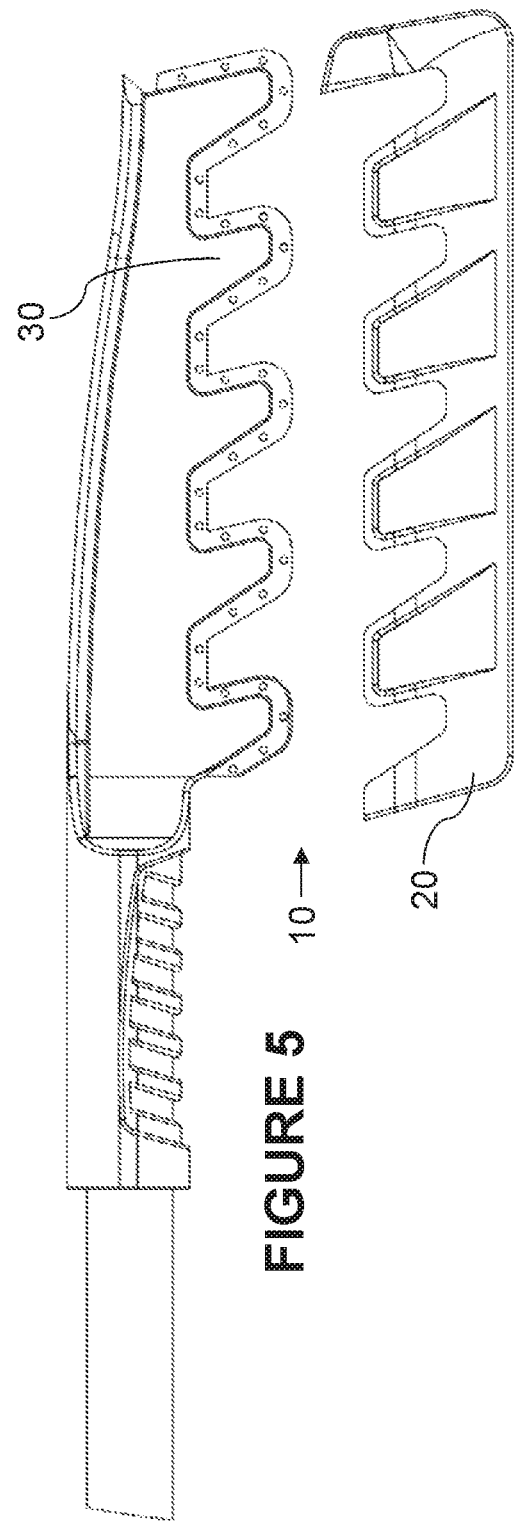
FIGURE 4
FIGURE 5

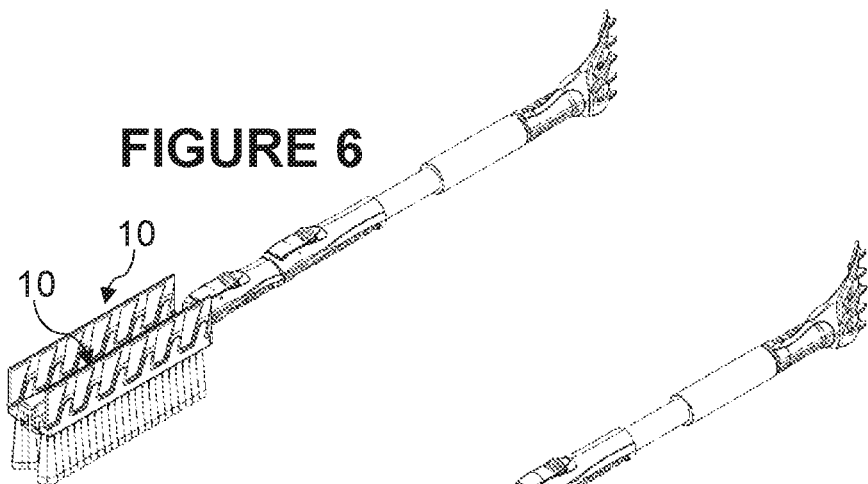
FIGURE 6
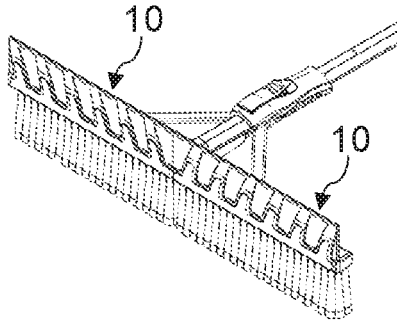
FIGURE 7
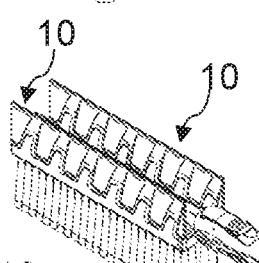
FIGURE 8
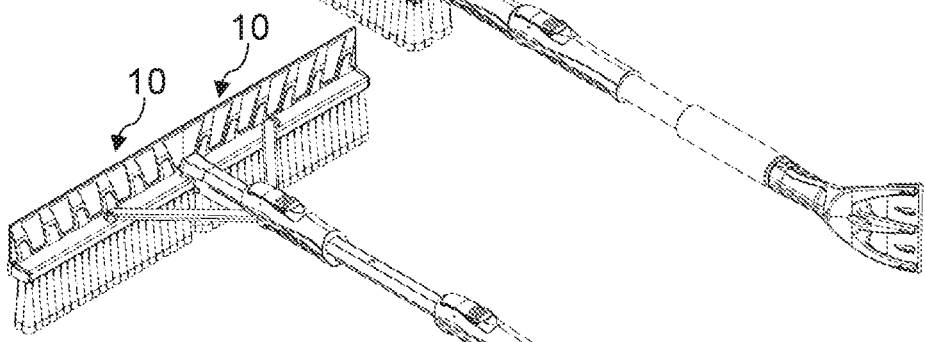
FIGURE 9

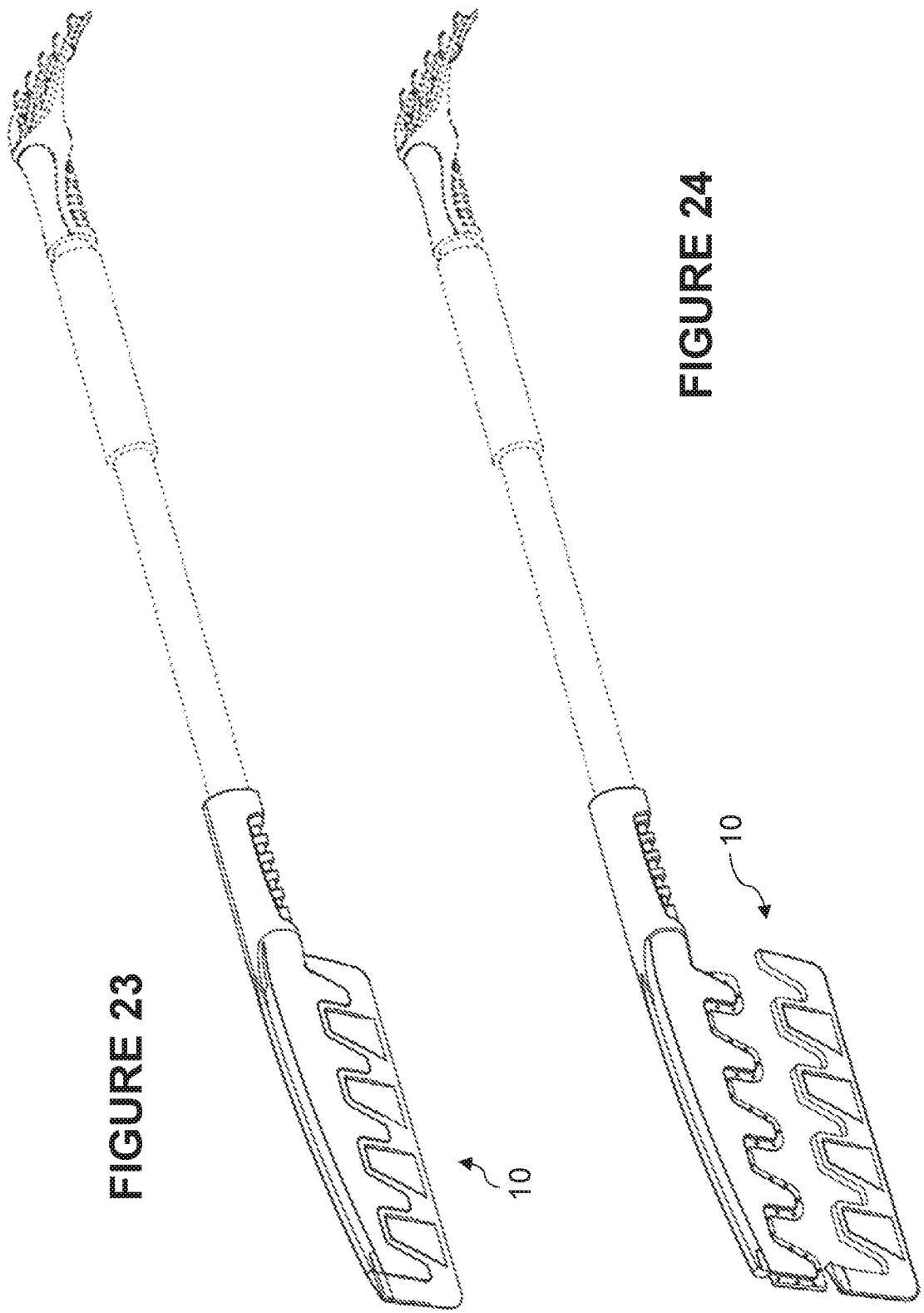

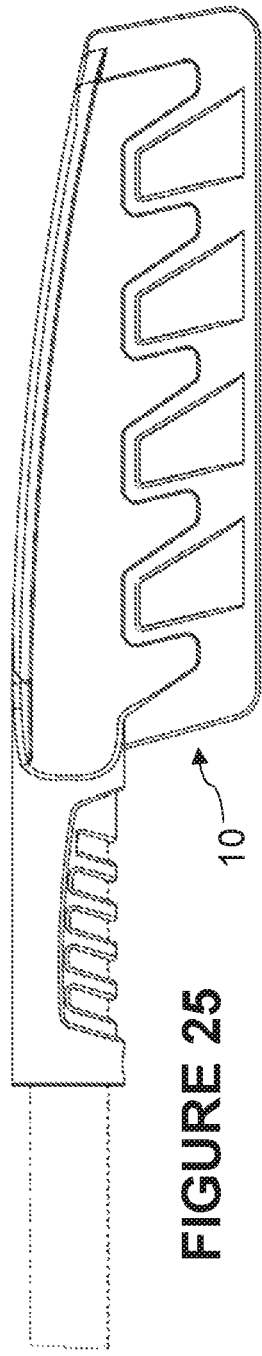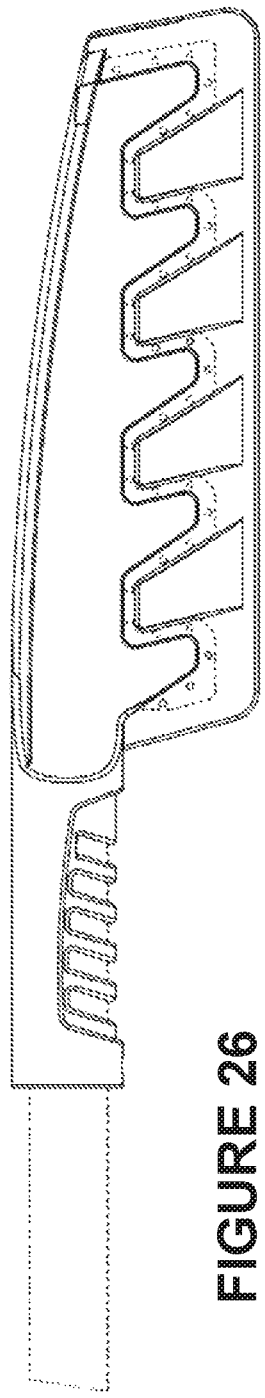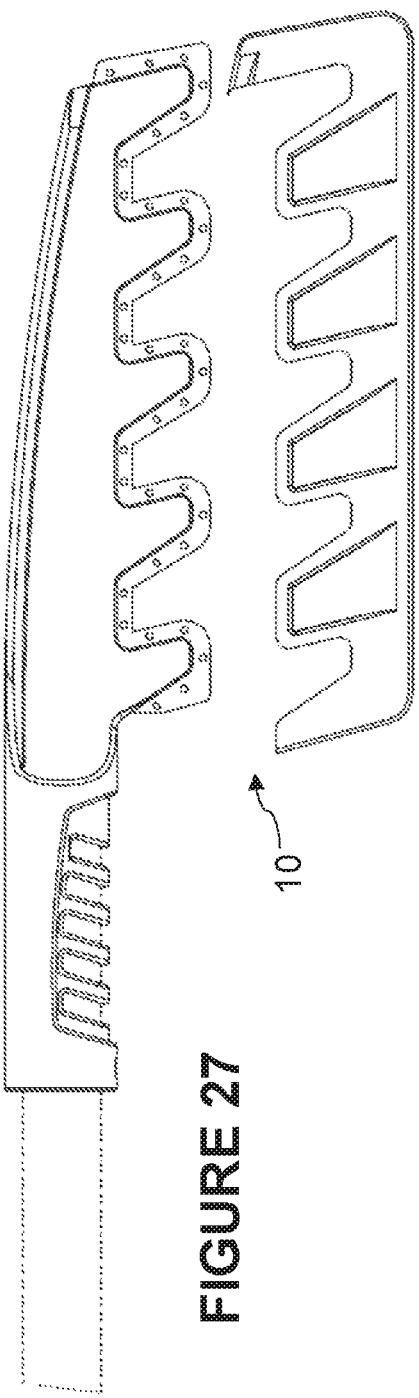

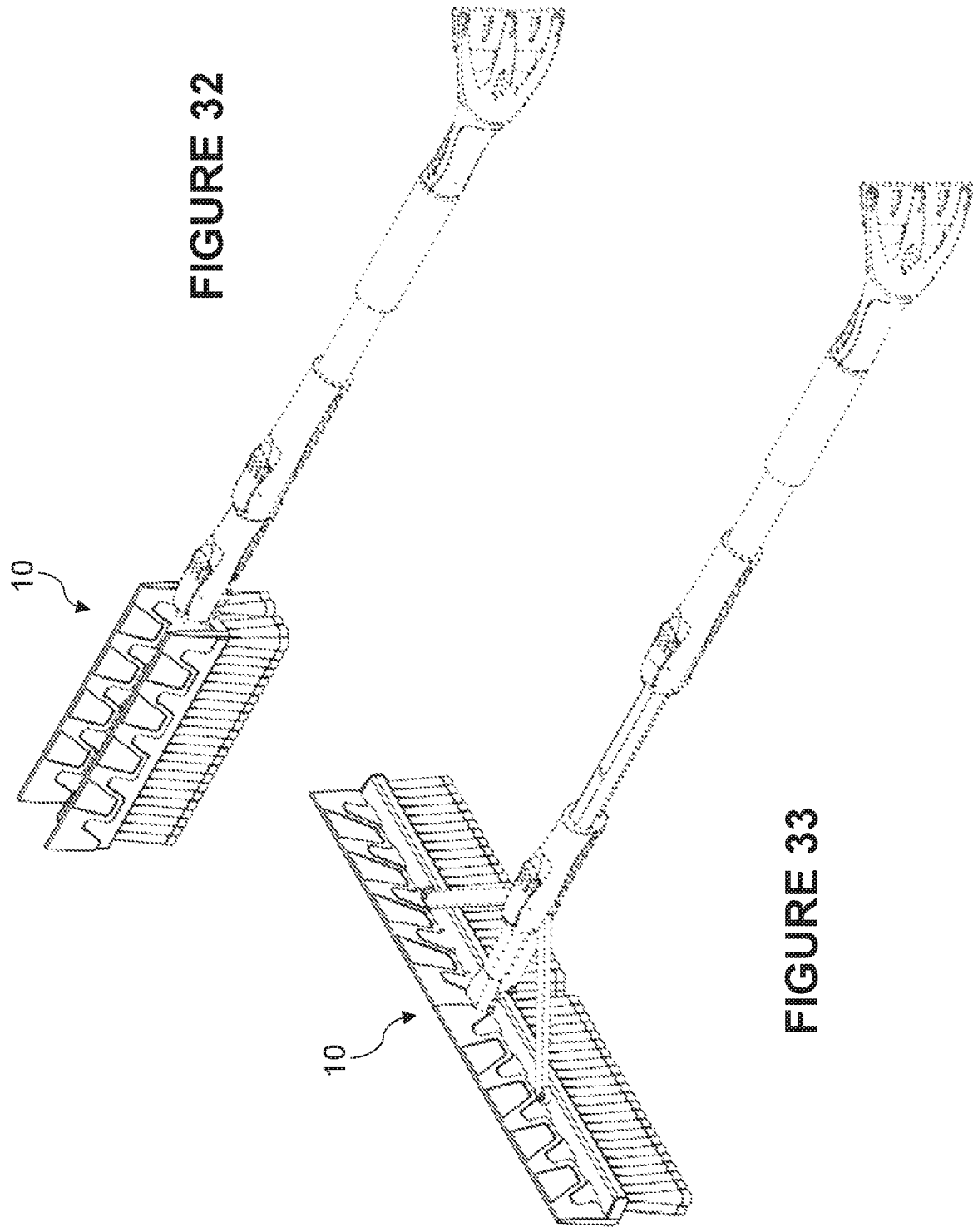

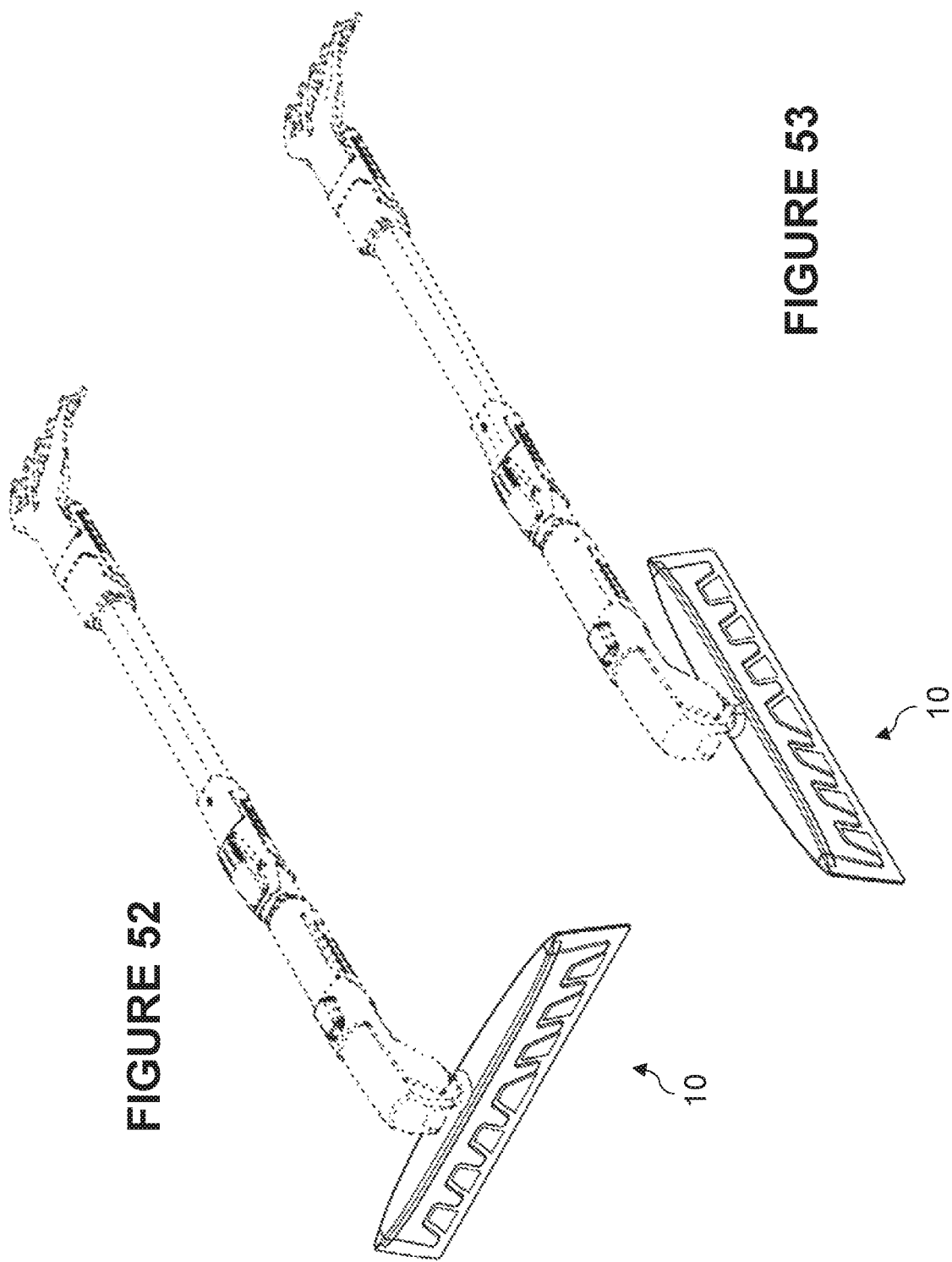

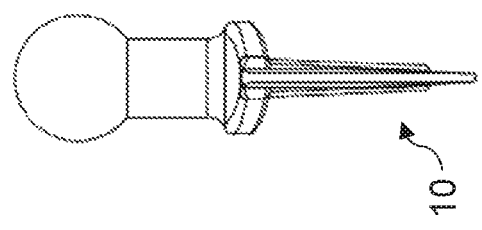
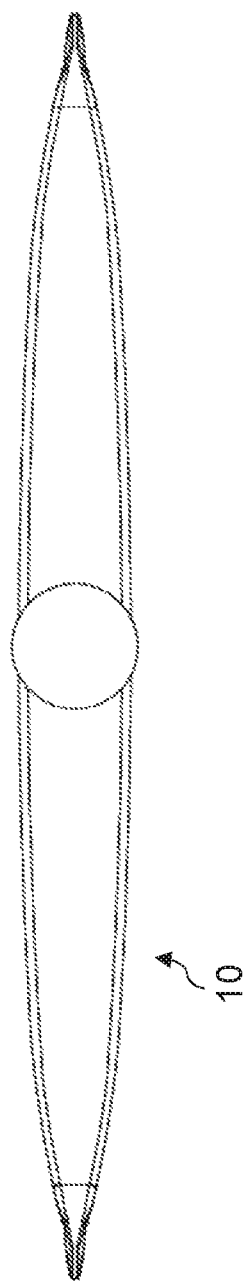
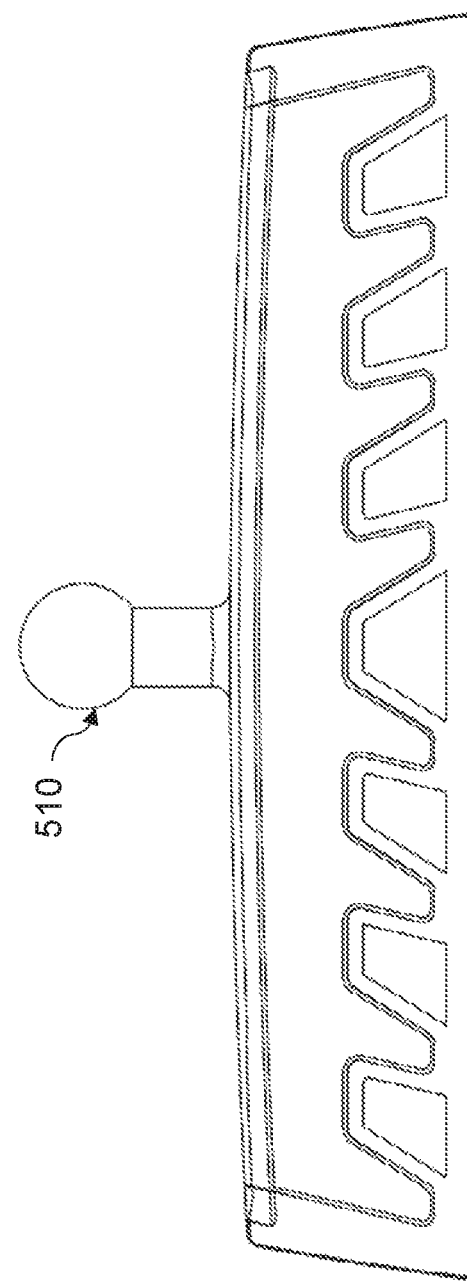

SCRATCH-FREE SNOW REMOVAL TOOL

CROSS-REFERENCE TO RELATED APPLICATIONS

This application claims benefit or priority of U.S. provisional patent application 62/663,527, filed Apr. 27, 2018, which is hereby incorporated herein by reference in its entirety.

BACKGROUND

(a) Field

The subject matter disclosed generally relates to snow removal tools. More specifically, it relates to snow brushes.

(b) Related Prior Art

There is today a wide variety of snow brushes on the market, each being specifically designed to address specific needs, e.g., comprising a wider brush, being more compact, being telescopic, comprising a more solid scraper, etc.

A new type of snow brush appeared on the market in recent years, where the bristles of the brush are replaced by foam, more specifically EVA (ethylene-vinyl acetate) foam. The reason behind this replacement takes its origin from observing that low-quality brushes have bristles which are not adapted to be rubbed against a car surface. Such brushes can scratch the surface of the car and damage the paint finish, especially when dust or residues lay on the car surface, in which case the low-quality bristles of the brush scrub the surface with the dust or residues. This is more pronounced for untreated brush bristles, while those undergoing fraying treatments can be advantageously less damageable. Nevertheless, there are cases where brush bristles are not suitable, e.g., car dealerships, car aficionados, or owners of luxury cars, who have an interest in keeping the surface of the car perfect and free of small scratches caused by the bristles scrubbing against it.

Replacing bristles by EVA foam addresses this issue by giving to the brush a smooth surface without damageable bristles. The EVA foam can easily deform under pressure against a car surface and does not offer any part which could damage the surface. It further conforms very naturally with the surface against which it is pressed such that moving the EVA foam implies sweeping the snow present on the surface.

Examples of bristles comprising EVA form include those marketed under the brands "Sno Brum™" or "Sno Pro™" which are a rectangular head of EVA foam provided at a distal end of a telescopic handle, thus forming a broom with a piece of foam acting as a brush. Another device is the one described in U.S. Pat. No. 9,221,432, where a piece made of layers of EVA foam is stuck between plastic shells and form a brushing head at a distal end. Both devices prevent scratching by providing a head made of a material (EVA foam) which is smooth with the surface on which it is applied.

These devices can however be improved for a more efficient snow removal while also being scratch-free.

SUMMARY

According to an embodiment, there is provided a snow removal tool comprising:

- a flexible blade presenting a sweeping surface extending in a plane, the flexible blade defining a blade edge which is continuous; and
- a plurality of fingers which are more rigid than the flexible blade and extend, in the plane of the sweeping surface, toward the blade edge without reaching the blade edge.

According to an aspect, the flexible blade is made of silicone.

According to an aspect, the flexible blade is made of thermoplastic elastomer.

According to an aspect, the snow removal tool further comprises a blade support from which the plurality of fingers extends.

According to an aspect, the blade support is made of any one of polypropylene, polycarbonate, polyethylene and ABS.

According to an aspect, at least a portion of the plurality of fingers are integral with the blade support from which they extend.

According to an aspect, the at least a portion of the plurality of fingers integral with the blade support are made of said any one of polypropylene, polycarbonate, polyethylene and ABS, of which the blade support is made.

According to an aspect, all of the plurality of fingers are integral with the blade support from which they extend.

According to an aspect, the blade support and the plurality of fingers comprise an inner slot extending in a longitudinal direction and the flexible blade is secured to the blade support and to the plurality of fingers by sliding an upper portion of the flexible blade into the inner slot.

According to an aspect, the blade support comprises only a single flexible blade, namely the flexible blade.

According to an aspect, the sweeping surface of the flexible blade has an upper edge which conforms to a contour of the fingers.

According to an aspect, the contour of the fingers comprises a border for securing the flexible blade thereto.

According to an aspect, the border of the fingers is pierced with apertures and the flexible blade is overmolded over the border of the fingers and through the apertures for securing the flexible blade thereto.

According to an aspect, the border of the fingers is thinner than a remainder of the fingers such that the flexible blade is overmolded over the border of the fingers for securing the flexible blade thereto, but not overmolded over the remainder of the fingers.

According to an aspect, the flexible blade is made of silicone or thermoplastic elastomer, and the plurality of fingers are provided as a longitudinally periodic thickening of the silicone or thermoplastic elastomer, the periodic thickening being thicker in comparison with a remainder of the flexible blade between the longitudinally periodic thickening.

According to an aspect, the flexible blade has a proximal corner and a distal corner, and the blade edge is continuous along a straight line from the proximal corner to the distal corner.

According to an aspect, the snow removal tool further comprises a second continuous sweeping edge extending upwardly from the distal corner.

According to an embodiment, there is provided a snow brush apparatus comprising the previously described snow removal tool.

BRIEF DESCRIPTION OF THE DRAWINGS

Further features and advantages of the present disclosure will become apparent from the following detailed description, taken in combination with the appended drawings, in which:

FIG. 4 is a side view illustrating a portion of the broom-style brush with the tool for scratch-free snow removal of FIG. 1;

FIG. 5 is an exploded side view illustrating the tool for scratch-free snow removal of FIG. 4;

FIGS. 6-9 are perspective views illustrating a two-part T-shaped brush (also called pull-push style) with a tool for scratch-free snow removal, according to an embodiment;

FIG. 23 is a perspective view illustrating an embodiment of the snow-removal tool 10;

FIG. 24 is an exploded perspective view of the tool of FIG. 23;

FIG. 25 is a close-up side view of the tool of FIG. 23;

FIG. 26 is a close-up, see-through view of the tool of FIG. 23;

FIG. 27 is a close-up exploded view of the tool of FIG. 23;

FIG. 32 is a perspective view illustrating another embodiment of the snow-removal tool 10, closed by default;

FIG. 33 is a perspective view of the tool of FIG. 32, but opened;

FIG. 52 is a perspective view of the tool of FIG. 50, in a second position;

FIG. 53 is another perspective view of the tool of FIG. 50;

FIG. 62 is a top view of the isolated tool of FIG. 50;

FIG. 63 is a side view of the isolated tool of FIG. 50; and

FIG. 64 is a front view of the isolated tool of FIG. 50.

It will be noted that throughout the appended drawings, like features are identified by like reference numerals.

DETAILED DESCRIPTION

Figure 1:
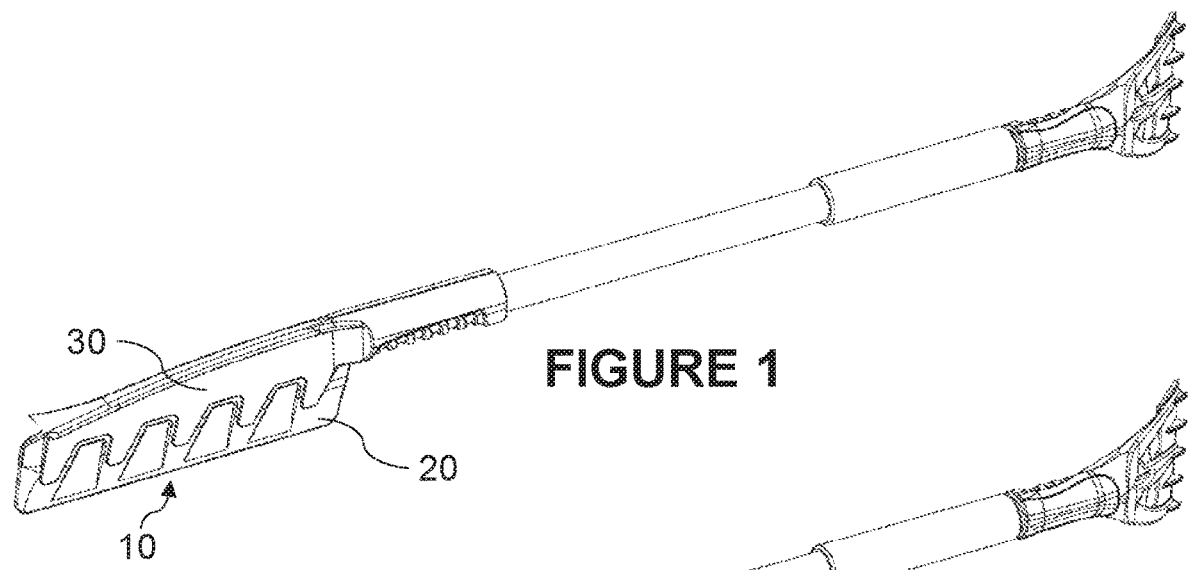
FIG. 1 is a perspective view illustrating a broom-style or wiper-style brush with a tool for scratch-free snow removal, according to an embodiment.
Figure 2:
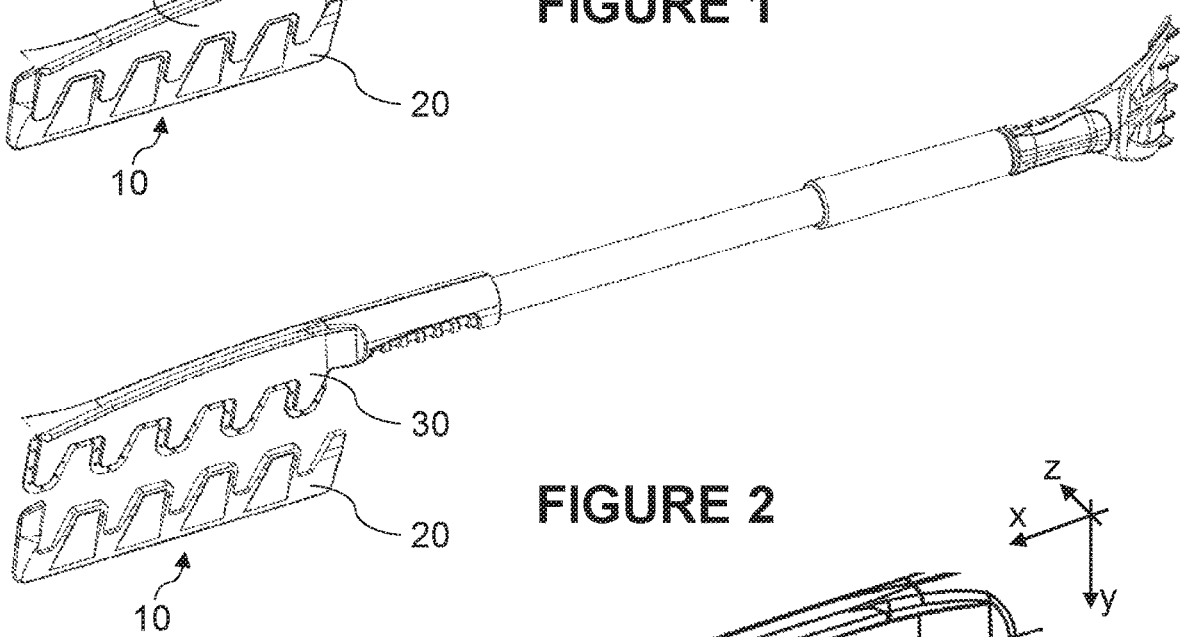
FIG. 2 is a perspective view illustrating the broom-style brush with an exploded view of the tool for scratch-free snow removal according to an embodiment.

It was found that the snow brushes comprising EVA foam do not support sweeping dense snow (such as wet snow). EVA foam parts easily bend when the tool is applied against a surface with dense snow. This makes the snow removal highly inefficient in such circumstances, as well as possibly damaging the EVA foam or requiring using another more rigid brush instead, thus losing the scratch-free feature.

There is now described a tool 10 for snow removal which can bear the additional force required to brush a surface on which dense snow or wet snow is to be removed.

Referring for example to FIGS. 1-5, the tool 10 comprises a flexible blade 20 and a more rigid blade support 30 comprising fingers 40 which give some rigidity to the flexible blade 20. The flexible material forming the flexible blade 20, preferably silicone or thermoplastic elastomer (TPE), provides the necessary mechanical behavior when the flexible blade 20 is applied onto a surface to effectively conform to the surface and perform sweeping of the snow. In a preferred embodiment, the rigid blade support 30 comprises only a single flexible blade 20 and not a plurality thereof. According to an embodiment, the flexible material forming the flexible blade 20 could also be EVA foam part.

The rigid blade support 30 extends in a direction which is normally aligned with the handle of the tool 10 (as shown in FIGS. 1-5), or which can be pivotable with respect to the handle (e.g., as shown in FIG. 6-9 or 15-16). Because of this possible feature (i.e., hingeability of the blade with respect to the complete brush handle), the spatial referential should be defined with respect to the blade arrangement itself, regardless of the other portions of the complete apparatus. As shown in FIGS. 3, 4, 10 and 16, axes can be defined with respect to the blade arrangement. The longitudinal axis is defined as the x-axis. Perpendicular to the longitudinal x-axis is the y-axis or transverse axis. The flexible blade extends in the xy plane. The other axis, which is orthogonal to both x and y axes, is the z-axis. The thickness of the flexible blade varies in the z-axis.

According to an embodiment, the flexible material forming the flexible blade 20, preferably silicone or thermoplastic elastomer (TPE), has a Shore A hardness comprised between 20 and 40. The tool 10 is typically used in snowy or icy winter conditions, i.e., at a temperature below 0° C. or approximately at this temperature. At such temperatures, the flexible material becomes more rigid than at room temperature, and the Shore A hardness range given above appears to give best results for sweeping.

The fingers 40 extend into the flexible blade 20 and are made of a more rigid material, such as polypropylene, polycarbonate or polyethylene, which gives a rigidity which prevents the flexible blade from bending or transversely deforming when the snow being swept is too dense. The fingers 40 thus improve the sweeping capacity of the flexible blade 20 when dense snow is being swept. Other materials such as ABS or any semi-rigid thermoplastic may also be considered for the fingers 40 and the blade support 30.

Examples of dense snow may include, without limitation, snow with water content such as wet snow, melting snow, snow exposed to rain; or compacted snow, such as layers of snow having previously melted, weight-compacted snow, snow with a crust of ice, etc.

The flexible blade 20 is preferably made of a single material, preferably silicone or TPE, for better ease of manufacture and durability.

The flexible blade 20 should be substantially flat in order to remain flexible. The flexible blade 20 thus extends in space and forms a blade surface (e.g., in a plane formed by the x-axis and y-axis). The blade surface has a bottom edge 21 which should conform with a surface to sweep. Therefore, for most embodiments, the bottom edge 21 will be substantially linear (i.e., forming a substantially straight line) between the proximal corner 121 and the distal corner 122 of the blade, as shown in FIG. 4 for example. If the surface to sweep is not flat, the bottom edge 21 could be curved (or otherwise shaped) to conform to that surface. Moreover, the injection point to mold the blade 20 must not be on the bottom edge 21.

The lateral edges 23 of the blade surface are shown as linear but could have other shapes. The height of the blade surface should be sufficient to present a blade surface for sweeping that is significant with respect to the thickness of the dense snow mass to be pushed, pulled or swept by the blade.

The upper edge 22 of the blade surface can be linear and parallel to the bottom edge 21, which would cause the blade surface to have a shape of a rectangle. Alternatively, the upper edge 22 of the blade surface can be linear but inclined with respect to the bottom edge 21, which would cause the blade surface to have a shape of a trapeze, thus giving to the bottom edge 21 an inclination with respect to the longitudinal axis of the tool 10 (i.e., the handle and the bottom edge 21 not being parallel). This particularly can be advantageously applied to the embodiment shown in FIGS. 1-5 to arrive at the embodiment shown in FIGS. 21-22 to have the handle moved away from the surface to be swept for greater user comfort. Furthermore, the embodiment of FIG. 20 ('S' tube) and of FIG. 22 (inclination of blade) can be combined.

However, the blade surface is rather shown has having a plurality of alternating tongues or upper edges 25 and recesses 24, formed by the upper edge 22 which periodically extends up and down, to conform with the fingers 40 of the blade support 30. The recesses 24 should correspond to the fingers 40, while the upwardly-extending tongues or upper edges 25 of the flexible blade 20 should correspond to the spacing 41 between adjacent fingers 40 on the blade support 30.

Figure 3:
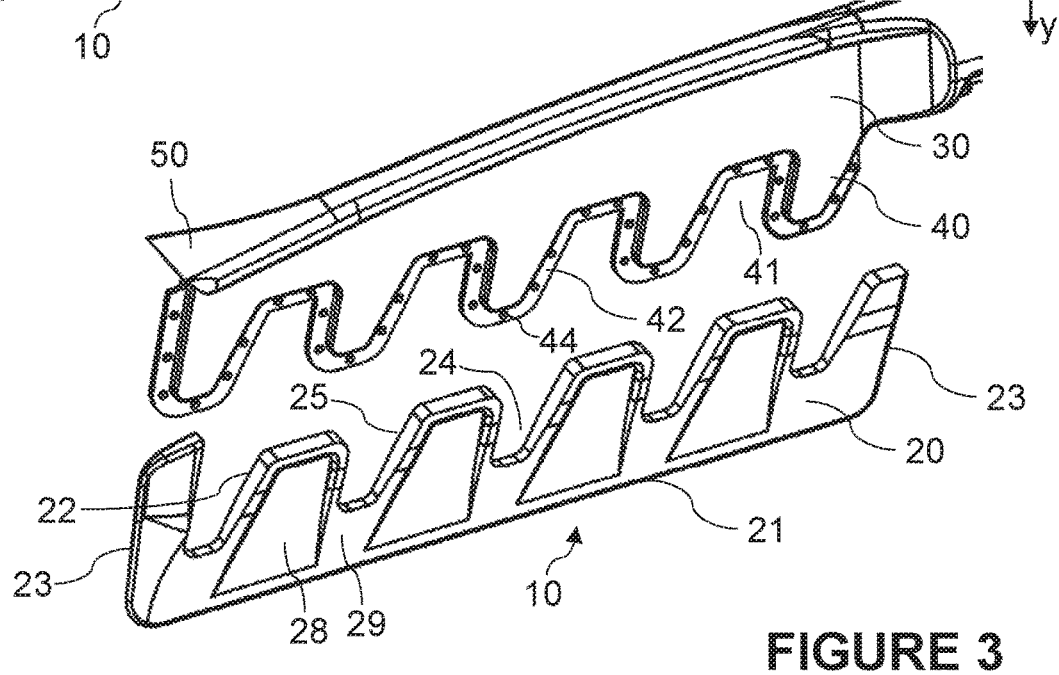
FIG. 3 is an exploded perspective view illustrating tool for scratch-free snow removal of FIG. 2.
Figure 10:
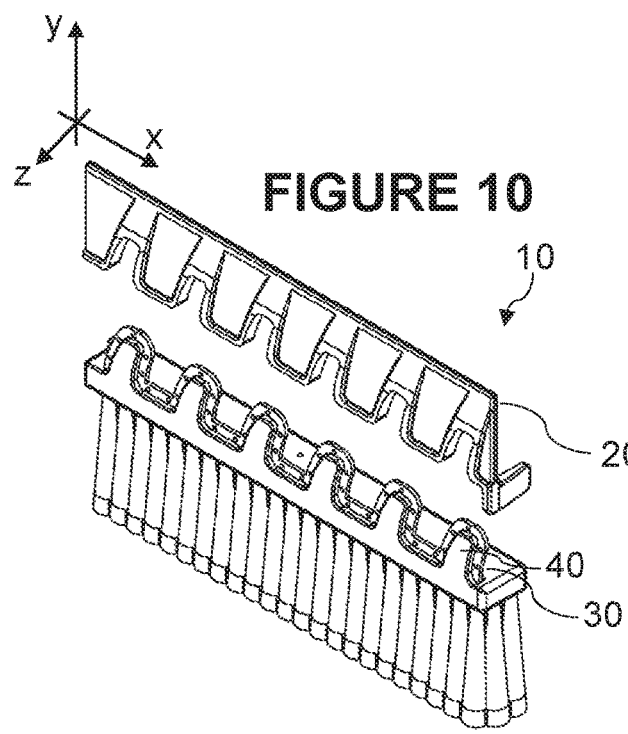
FIGS. 10-14 are exploded views illustrating the tool for scratch-free snow removal of FIGS. 6-9, according to an embodiment.
Figure 11:
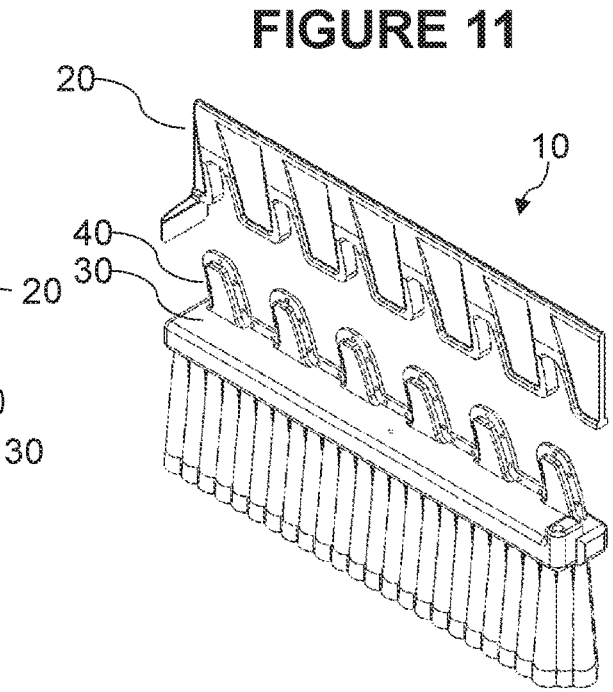
Figure 12:
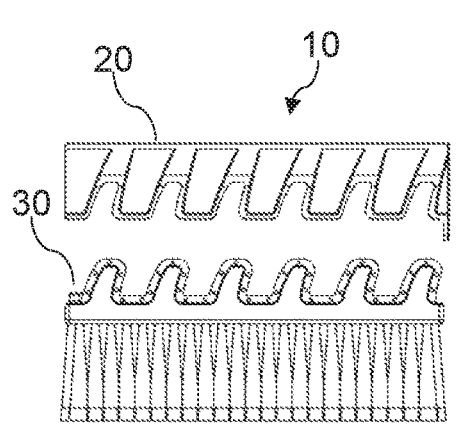
Figure 13:
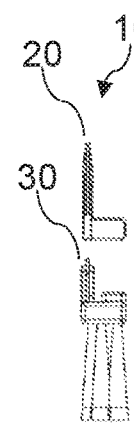
Figure 14:
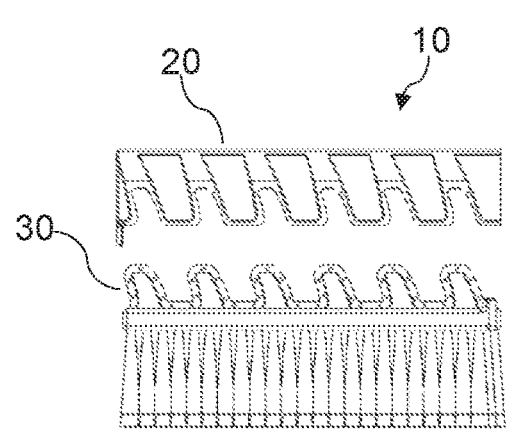
Figure 18:
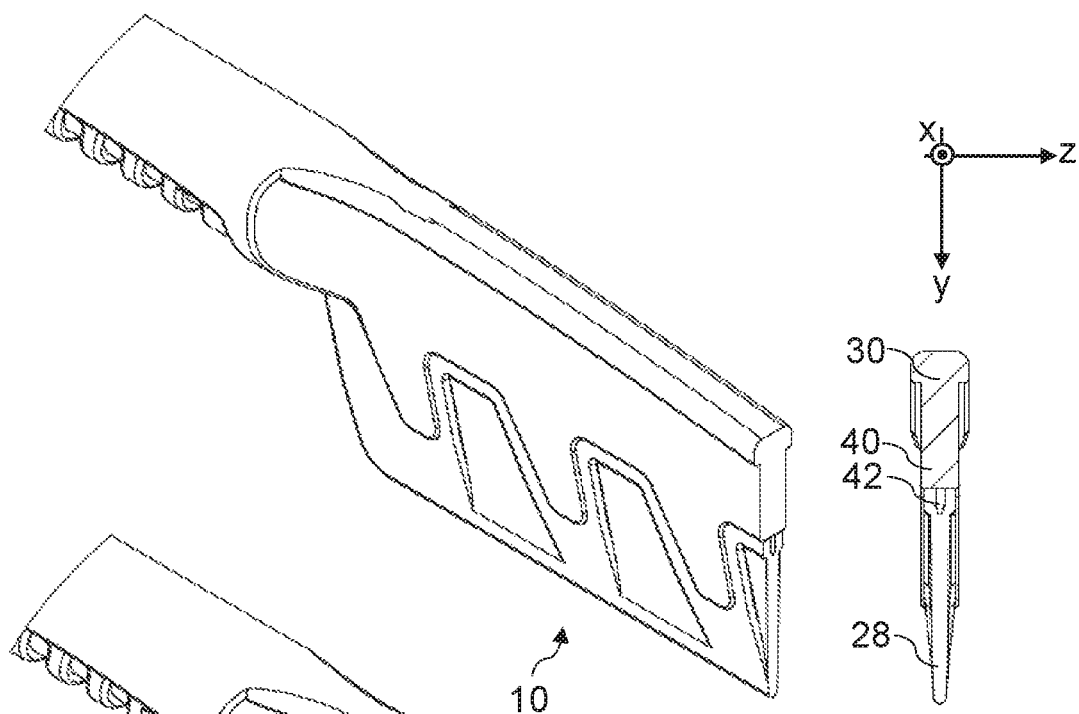
FIGS. 18-19 are cross-section views illustrating the cross-section of the tool for scratch-free snow removal of FIG. 1 at two different locations.
Figure 19:
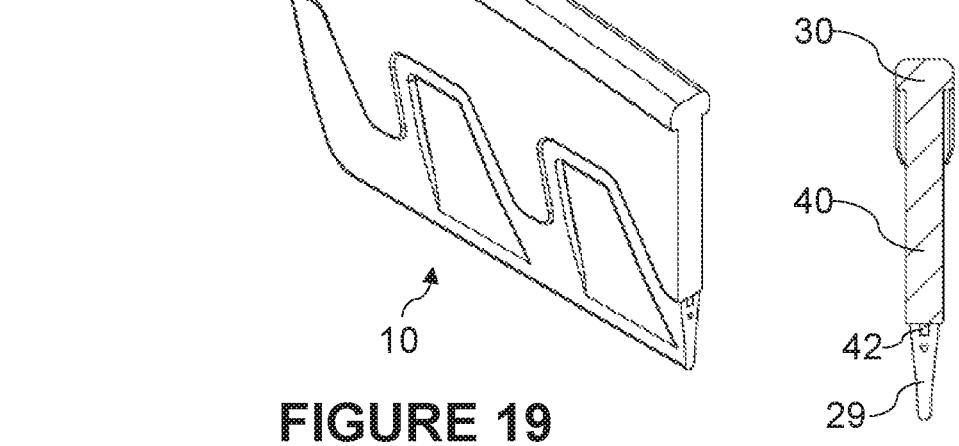

According to an embodiment, the thickness of the flexible blade 20 can be variable. Factors on which the thickness at a given location on the flexible blade 20 can vary may include, without limitation, proximity to a finger 40, proximity to a specific part of a finger 40, proximity to the sweeping edge 21 of the flexible blade 20, proximity to the lateral edge 23 of the flexible blade 20, proximity to the connection with the blade support 30 (along the upper edge 25), or intended workload of the tool. For example, FIG. 3 shows thin portions 28 and thick portions 29, where thick portions 29 have a thickness of flexible material (silicone, TPE) that is significantly greater than the thickness of the thin portions 28. It is also thick by the upper edge 25 for force transmission to the blade support 30. FIGS. 18-19 are cross-sections through a finger (FIG. 19) and through the thin portion 28 between fingers (FIG. 18), showing the variable extension of the fingers in the y-axis and showing how the profile of the flexible material of the blade varies with respect to the presence or absence of a finger at that location.

For example, material thickness of the flexible blade 20 can be expected to be higher for locations close to the fingers 40, especially right below them, to ensure that rigidity is given to the sweeping edge. At the sweeping edge, and on the side of the flexible blade 20, the thickness should be high too.

Thickness can be reduced elsewhere as it is less critical for sweeping dense snow. This further lowers the weight of the tool for greater comfort of use. It also ensures that less material is needed, which is a significant advantage when a material such as silicone or TPE is used since such a material contributes significantly to the cost of fabrication of the tool. Requiring less of such a material significantly reduces this cost.

Although the thickness can be reduced on various surfaces of the flexible blade 20, it should preferably not be zero, since this would imply holes in the flexible blade 20 through which the snow can pass and therefore is not swept properly. Therefore, the flexible blade 20 should provide a continuous surface (without holes) on its sweeping surface (i.e., the xy plane) facing the snow to be swept.

Now referring to the fabrication of the tool 10, the arrangement of the flexible blade 20 and the blade support 30 can be manufactured in different ways.

In a preferred embodiment, the method of fabrication involves overmolding. A first mold is used to fabricate the blade support 30 including the fingers 40. This article is then introduced inside a second mold for molding the flexible blade 20 over the fingers 40, or over a portion thereof.

According to an embodiment, the fingers comprise a securing border 42, as shown in FIGS. 2-3, 5, 10-14 and 17. The securing border 42 is the portion of the fingers 40 over which the flexible blade 20 is molded. In this case, during the second molding step of the flexible blade 20, the flexible blade 20 only covers the securing border 42 and thus leaves the remainder of the fingers 40 uncovered, as shown in FIGS. 1, 4, 6-9, and 15-16. Overmolding may also result in covering the fingers with the flexible material, i.e., the flexible does not only cover the securing border 42, but also cover (partially or completely) a surface of the fingers.

According to an embodiment, the securing border 42 comprising an aperture 44, or a plurality of apertures 44, or a slot. This feature allows overmolding of the flexible material of the flexible blade 20 by making the flexible material flow through the aperture(s) 44 or slot during the molding process and connects to itself, thereby self-riveting itself on the securing border. It secures an additional mechanical bonding on top of the adhesion of materials used to attach blade 20 to support 30.

According to another embodiment, the blade support 30 and the flexible blade 20 are molded separately (or fabricated in another way but separately). Once they are created, the blade support 30 and the flexible blade 20 are assembled with a bonding agent or mechanically.

According to an embodiment, assembling the blade support 30 and the flexible blade 20 comprises providing a longitudinal slot (aka an inner slot) in the blade support 30, including a slot crossing the fingers 40, to slide the flexible blade 20 thereinto and secure it in this position. In this case, the flexible blade should have a base acting as an insert of a shape which complements the slot in the blade support 30. In an embodiment, the flexible blade 20 is slid from the bottom in an upward direction. In another embodiment, the flexible blade 20 is slid from the front, rearwardly (e.g., toward a handle). These sliding directions can also be inverted.

According to an embodiment, the flexible blade 20 is immersed in a soap mixture or another fluid having a lubricating effect to facilitate the insertion and sliding of the flexible blade 20 in a slot of the blade support 30. After insertion, the soap mixture dries up and the flexible blade 20 is not further lubricated, thus being stuck in the slot and effectively secured therein. Alternatively, after insertion in a slot of the blade support 30, the flexible blade 20 can be mechanically secured therein for greater solidity of the arrangement, e.g., it can be screwed, riveted or fastened.

In another embodiment, the slot is rather provided in the flexible blade 20 and the blade support 30 is inserted or slid thereinto. In this case, the blade support 30 should comprise an insert which would be very much similar to the securing border 42, although the apertures 44 would not be necessary in this case. Techniques for lubricating, sliding and securing the assembled parts would be similar as described above.

If the flexible blade 20 and the blade support 30 are assembled by insertion or sliding, and if the slot is provided in the flexible blade 20, there can be an embodiment in which the flexible blade 20 presents, within its slot, bores into which the fingers 40 can be inserted as part of the assembly by insertion. In this case, the fingers 40 would not be visible to the user as they would extend inside the flexible blade 20.

Figure 15:
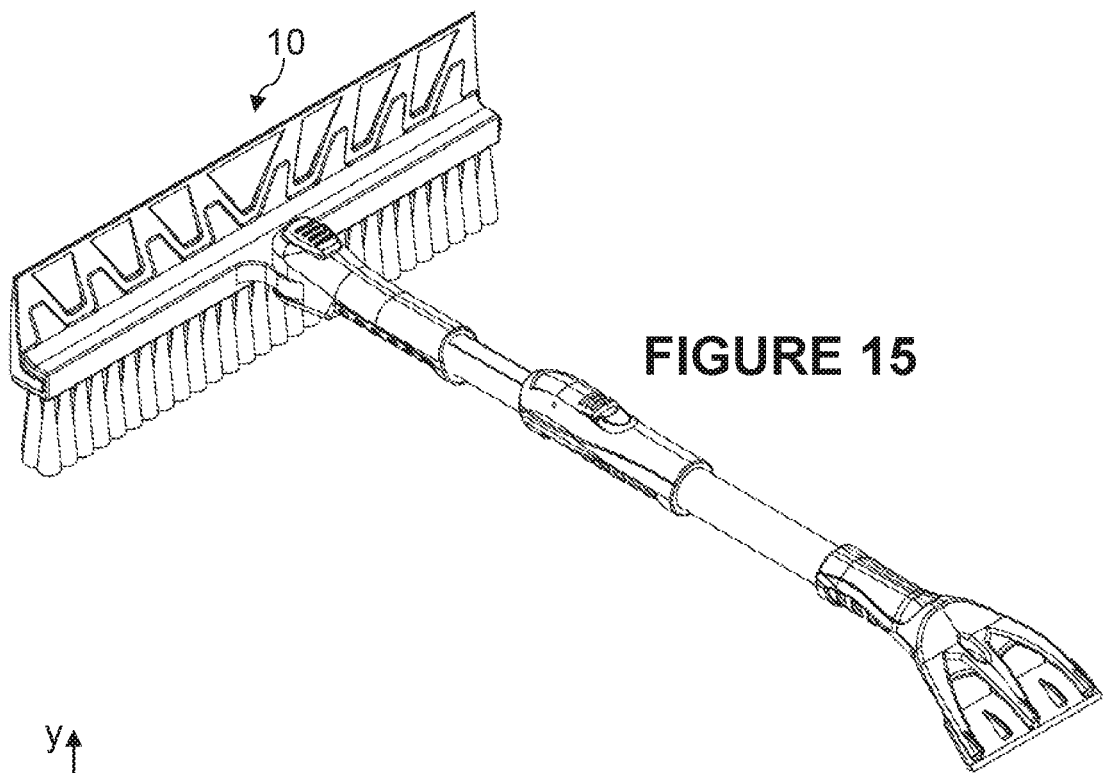
FIGS. 15-16 are perspective views illustrating a single-part T-shaped brush with a tool for scratch-free snow removal, according to an embodiment.
Figure 16:
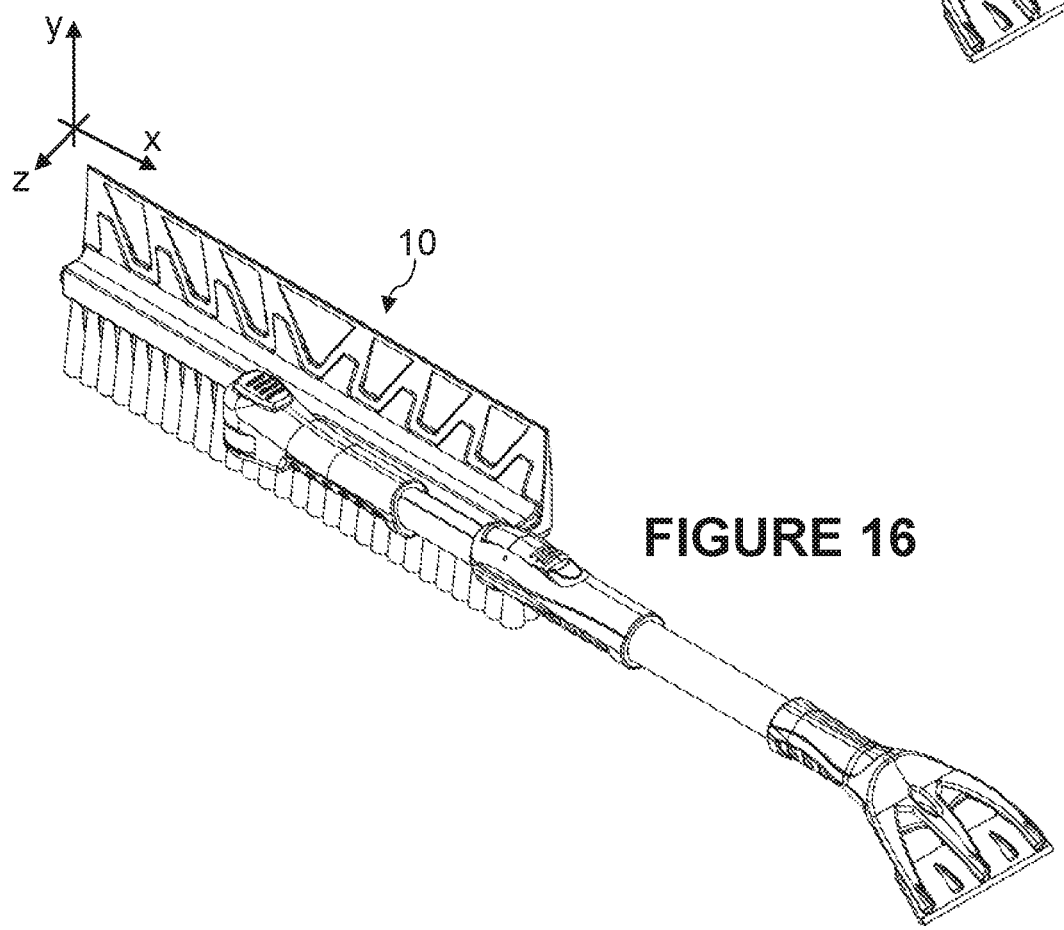
Figure 17:
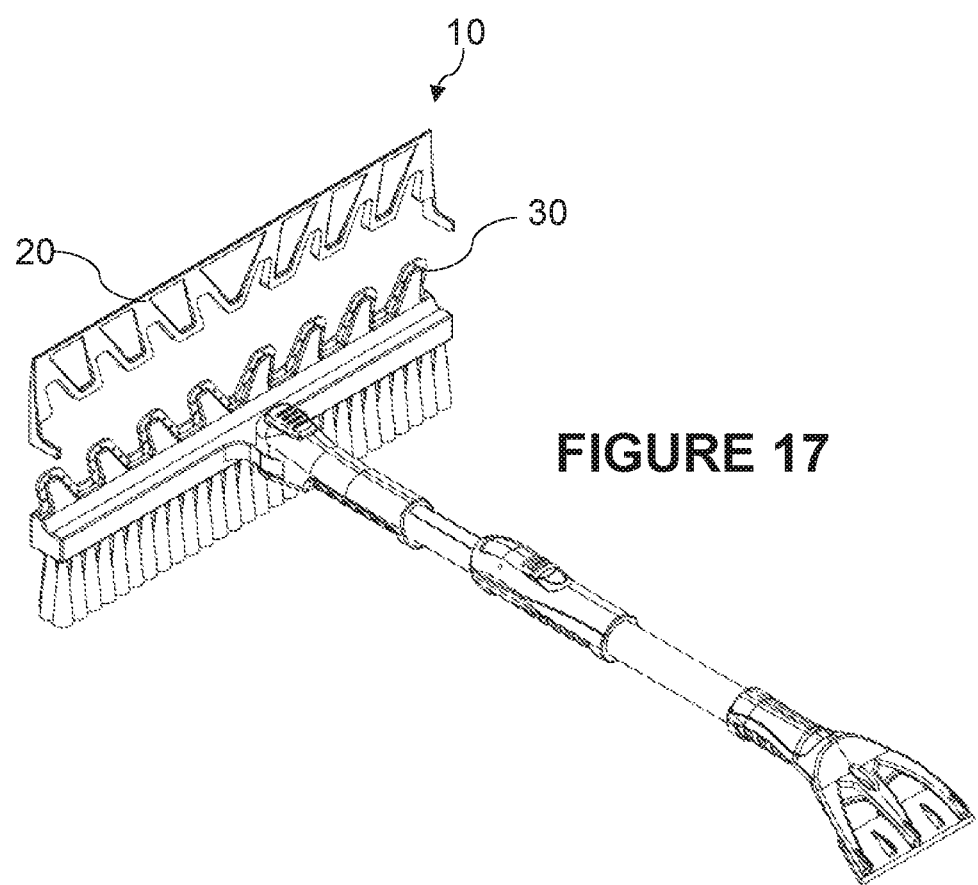
FIG. 17 is an exploded perspective view illustrating the tool for scratch-free snow removal of FIGS. 15-16, according to an embodiment.

Once the blade support 30 and the flexible blade 20 are assembled, they form the tool 10. The tool 10 can be used as a standalone tool, preferably with a handle, to form a snow-sweeping tool. More practically, the tool 10 is integrated to a more complete snow brush apparatus or ice scraper apparatus, as shown in the figures. For example, it can be integrated to a broom-style or wiper-style brush with scraper as shown in FIGS. 1-5, or as a two-part T-shaped brush as shown in FIGS. 6-14, or as a single-part T-shaped brush as shown in FIGS. 15-17.

If the tool 10 is integrated to the two-part brush of the two-part T-shaped brush as in FIGS. 6-14, there should be provided two tools 10 which, although technically separate as shown in FIGS. 6 and 8, together form a single surface when the T is formed during use as shown in FIGS. 7 and 9.

The tool 10 can be provided as a replacement for the traditional bristle brush, as shown in FIG. 1, or in addition to a traditional bristle brush, as shown in FIGS. 6-9 or FIGS. 15-16. According to an embodiment, the tool 10 can provide a tube or another type of connector by the blade support 40 which would connect (e.g., with a snap-fit connector, or a rivet connector) with a remainder of the brush apparatus or scraper apparatus.

According to an embodiment, additional instruments can be added to the tool 10. For example, a small scraper 50, as shown in FIG. 3, can be added to the tool 10.

The flexible blade 20 should preferably offer two surfaces for sweeping since it is substantially planar. It can thus be used in both directions (back and forth).

It can advantageously be used as a replacement for bristle brushes to sweep a load of dense snow, or even low-density snow, without scratching the surface of a vehicle or any other painted or coated surface being swept since the portion in contact with the surface is the bottom edge 21, which is made of silicone or TPE. The absence of bristles makes scratching less probable. It is also less likely that the bottom edge would accidentally carry dirt and dust (unlike with bristles), which would provide a risk of scratching too.

The fingers 40 should prevent bending the flexible blade 20 when sweeping dense snow. Greater thickness of the flexible material (silicone, TPE) close to the fingers 40, especially in the region distal to the fingers (e.g., "below" the tips thereof), and by the edges (especially the upper edge 25) should further prevent the bending that would occur with prior art EVA foam brushes.

Although the tool 10 was described above with respect to the inclusion of a plurality of rigid fingers, it can also be described as comprising a periodic arrangement of rigid members in the longitudinal direction of the blade. The blade 20 should therefore be flexible, i.e., silicone or TPE with appropriate hardness, and contain periodic rigid features either as inclusions of rigid members or by periodic local thickening of the flexible material. The periodic rigid features or periodic rigid members are periodic with respect to the longitudinal axis, i.e., the axis in which the tool 10 extends, which implies that they repeat themselves in the longitudinal direction. In this spatial referential, one can say that the periodic rigid members extend in the transversal direction (i.e., locally perpendicular to the longitudinal axis).

The periodic rigid members correspond to the fingers inside the flexible blade 20 and extending transversely from the blade support 30. Alternatively, they can correspond to fingers inside the flexible blade 20 and separate from the blade support 30 (i.e., independent inclusions in the flexible blade 20).

According to another embodiment, the fingers 40 can be part the flexible blade 20 itself. In other words, instead of extending from the blade support 30, the fingers are incorporated into the flexible blade 20 to form a single blade having the desired properties, the single blade being then attached to the finger-less blade support 30 offering a continuous flat edge for attachment. The attachment can be one such as those already described herein.

In another embodiment, the periodic rigid members correspond to periodic thickened flexible material in the flexible blade 20. By thickening the flexible material, the flexible blade locally has a rigidity which is increased, as if rigid fingers were used. Therefore, this embodiment removes the requirement for rigid fingers acting as insertions into the flexible blade. This embodiment may or may not be advantageous depending on the differential pricing of the materials involved in the different embodiments.

Figure 20:
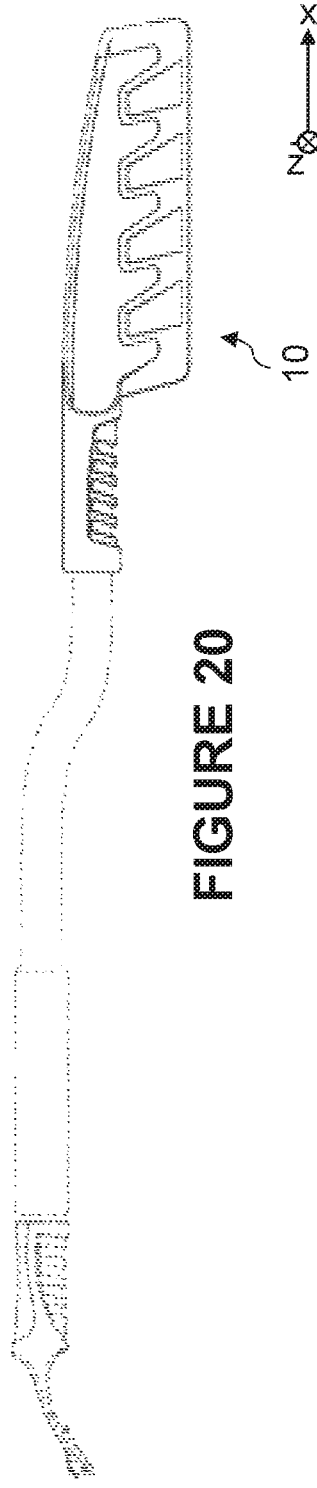
FIG. 20 is a side view illustrating the tool for scratch-free snow removal with an offset handle for freeing the hand of the user, according to an embodiment.
Figure 21:
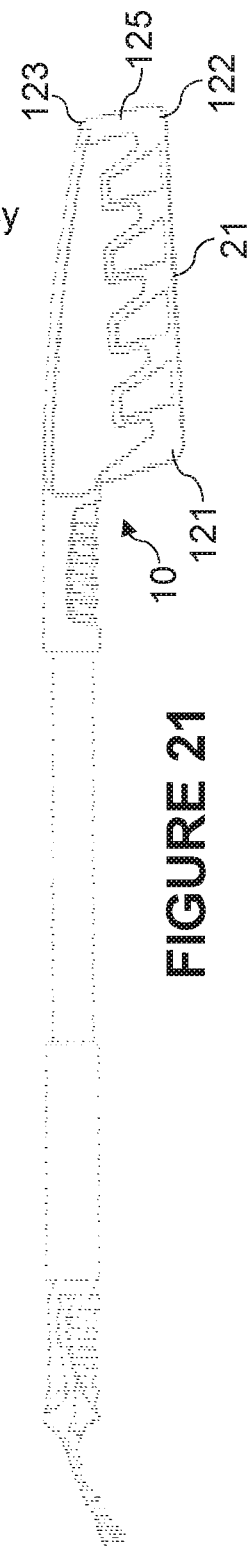
FIG. 21 is a side view illustrating the tool for scratch-free snow removal with an inclined sweeping edge for freeing the hand of the user, according to an embodiment.
Figure 22:
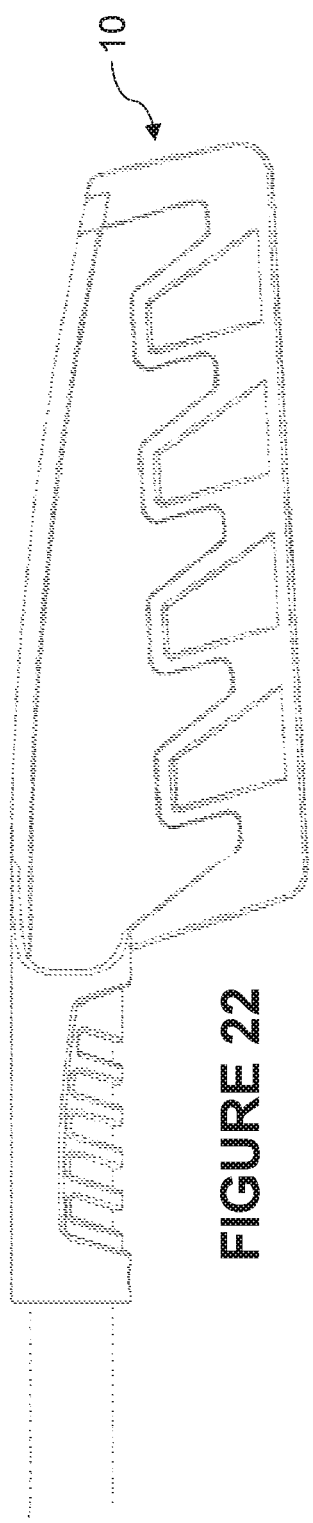
FIG. 22 is a close-up view of the tool of FIG. 21.
Figure 28:
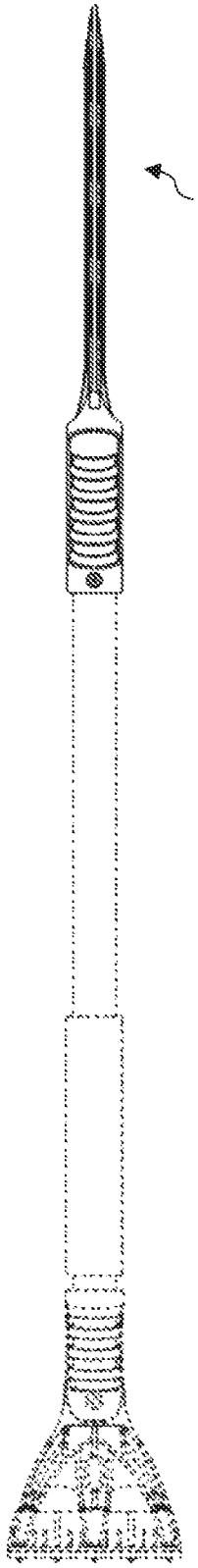
FIG. 28 is a top view of the tool of FIG. 23.
Figure 29:
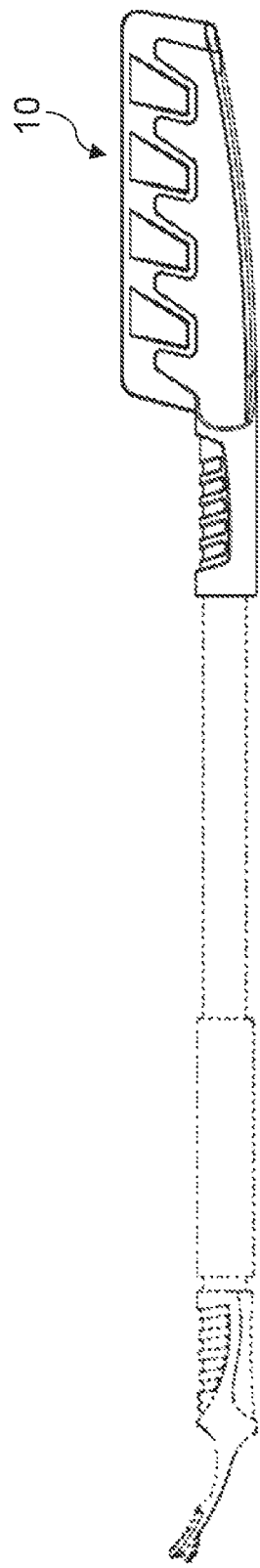
FIG. 29 is a side view of the tool of FIG. 23.
Figure 30:
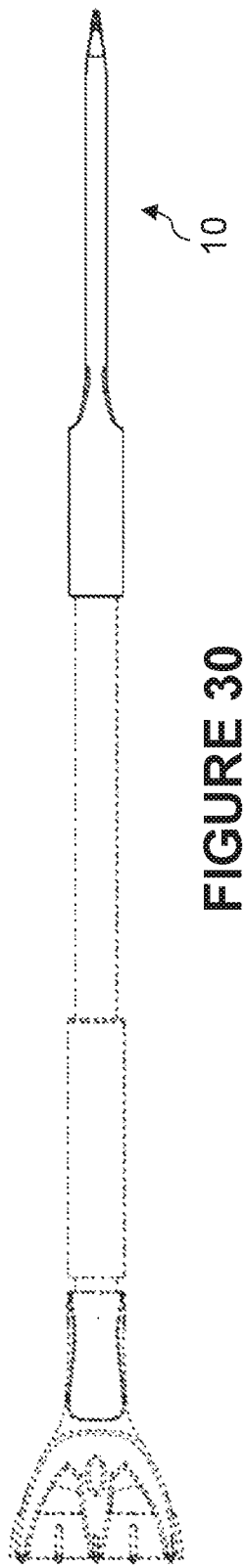
FIG. 30 is a bottom view of the tool of FIG. 23.
Figure 31A:
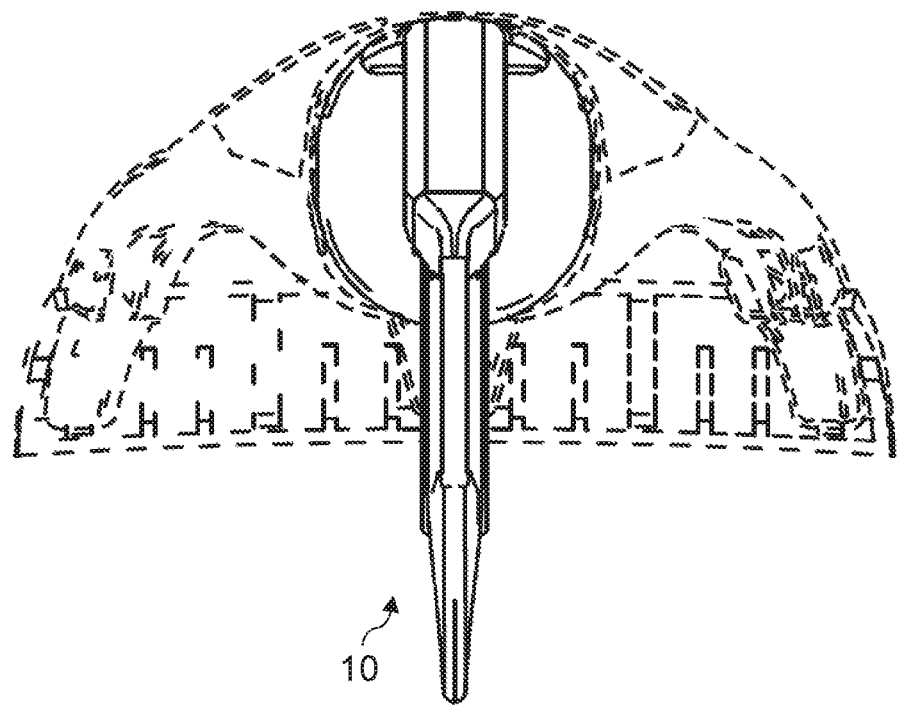
FIG. 31A is a front view of the tool of FIG. 23.
Figure 31B:
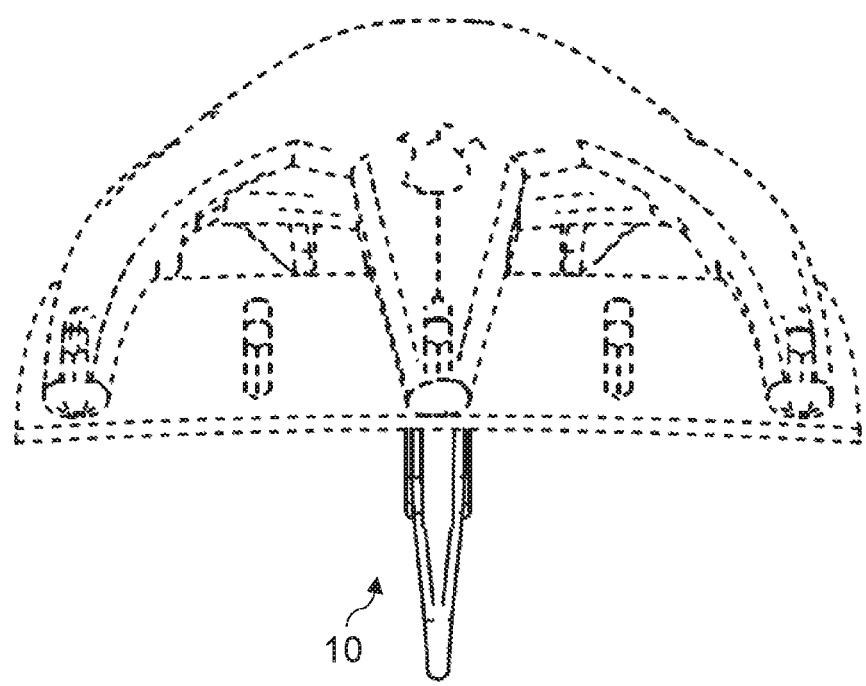
FIG. 31B is a rear view of the tool of FIG. 23.
Figure 34:
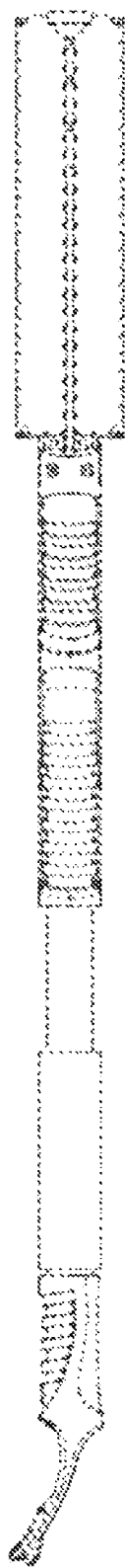
FIG. 34 is a top side view of the tool of FIG. 32.
Figure 35:
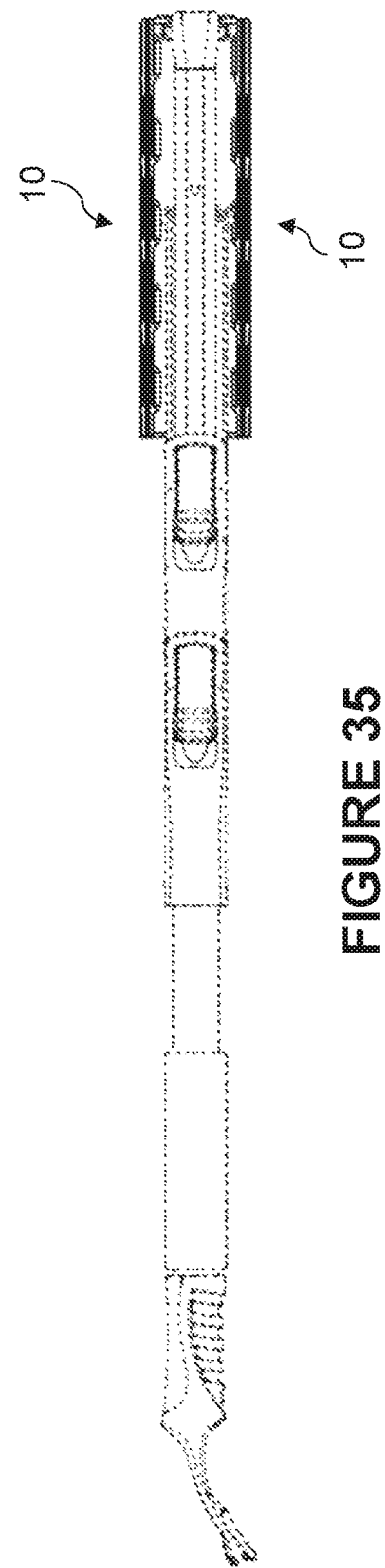
FIG. 35 is a bottom view of the tool of FIG. 32.
Figure 36:
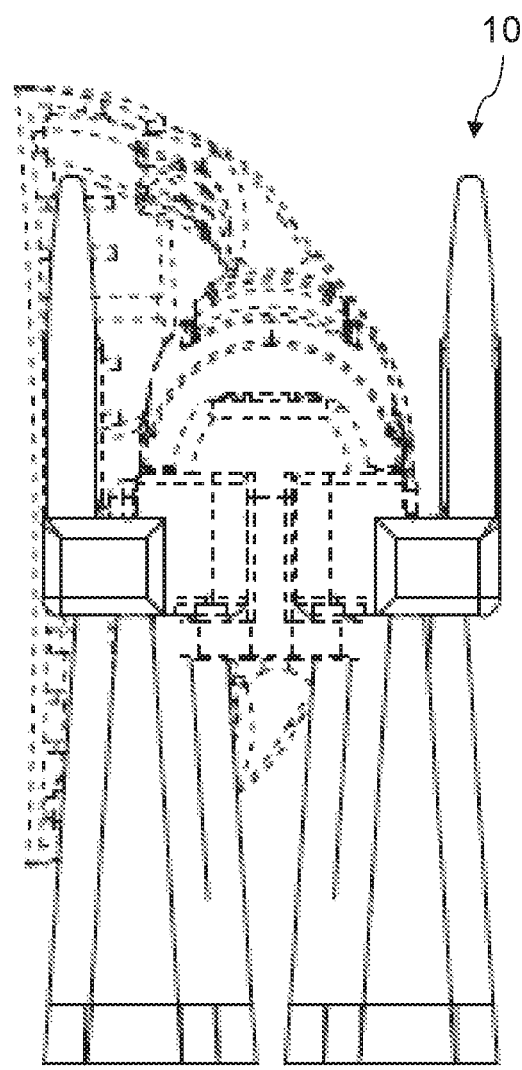
FIG. 36 is a front view of the tool of FIG. 32.
Figure 37:
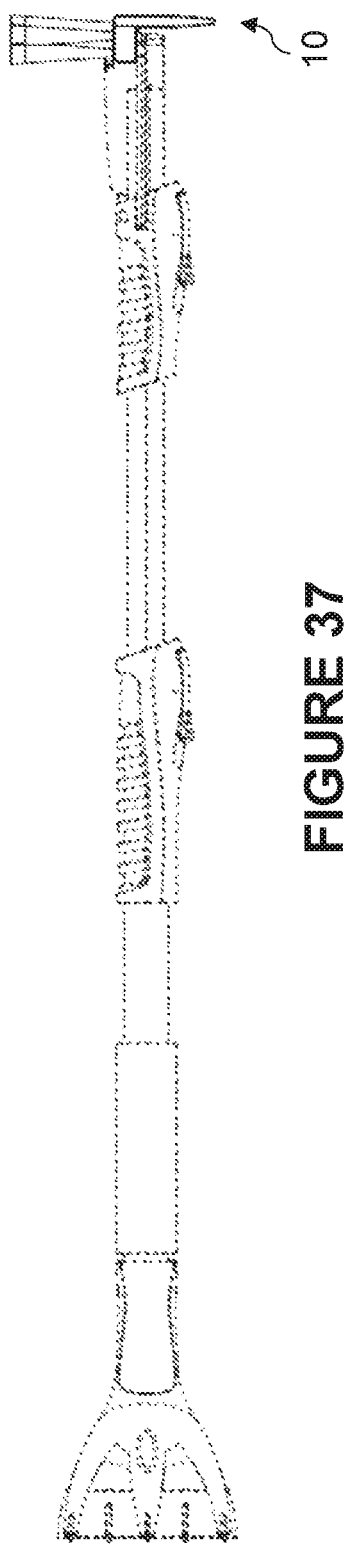
FIG. 37 is a side view of the tool of FIG. 33 (opened)
Figure 38:
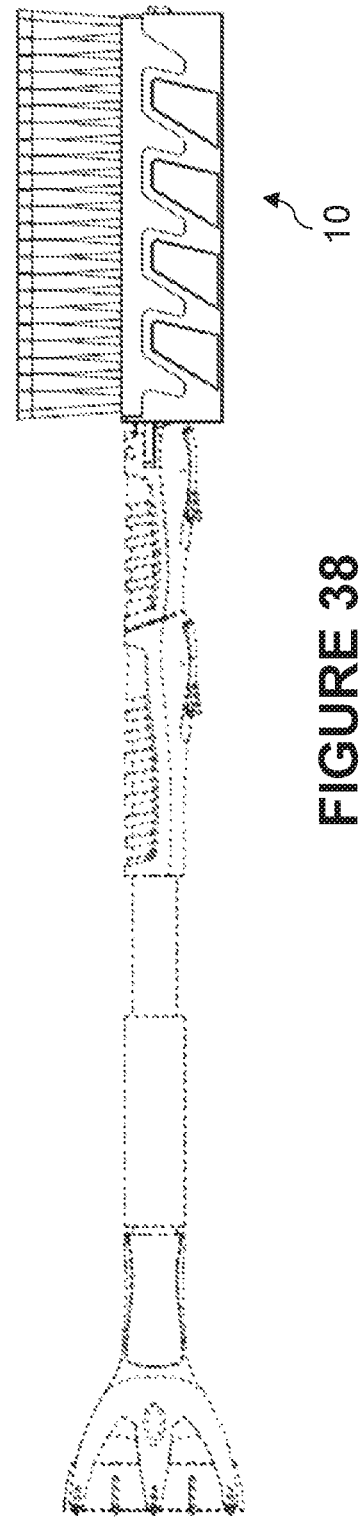
FIG. 38 is a side view of the tool of FIG. 32.
Figure 39:
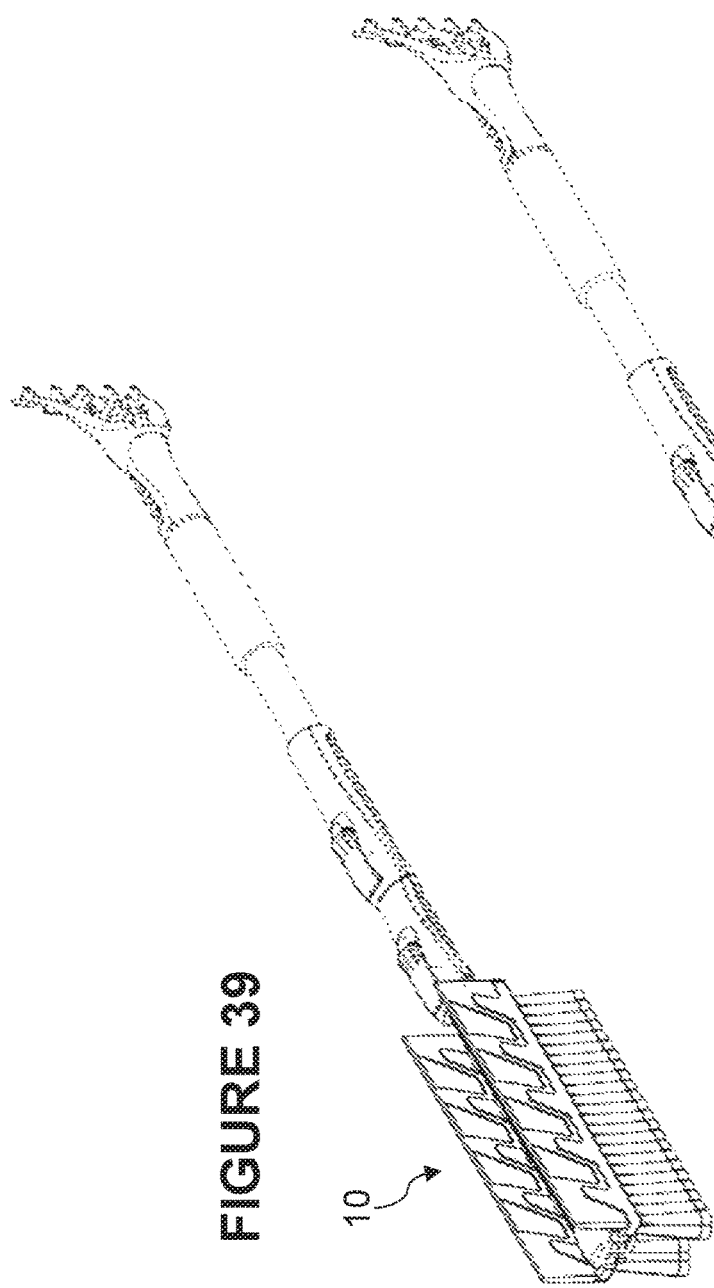
FIG. 39 is another perspective view of the tool of FIG. 32.
Figure 40:
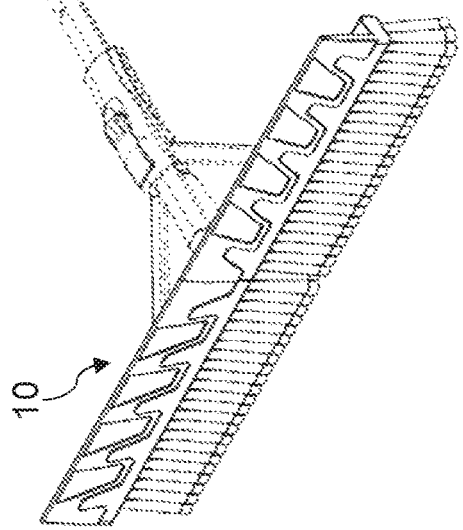
FIG. 40 is another perspective of the tool of FIG. 33 (opened)
Figure 42:
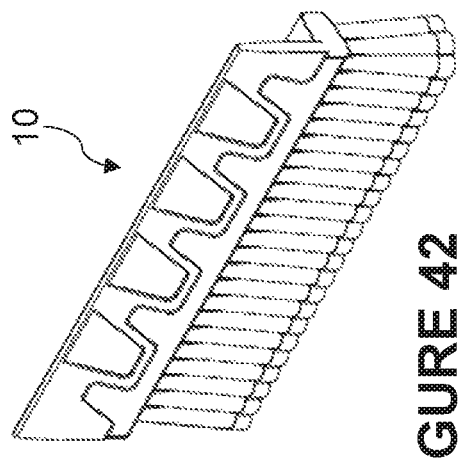
FIGS. 41-44 are a top view, a perspective view, a front view and a side view of an isolated portion of the tool of FIG. 32.
Figure 44:
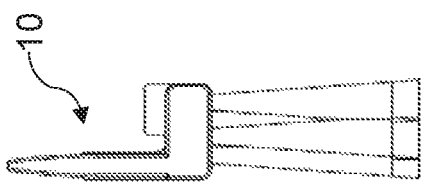
Figure 41:
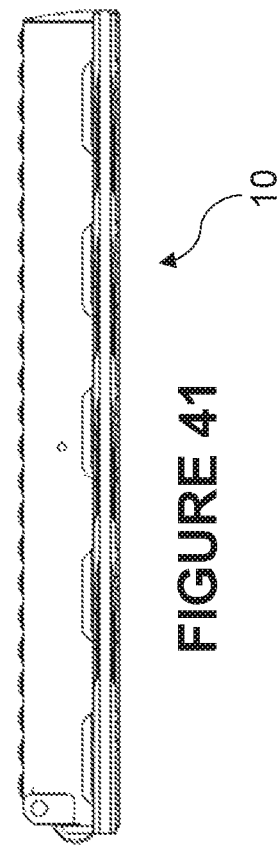
Figure 43:
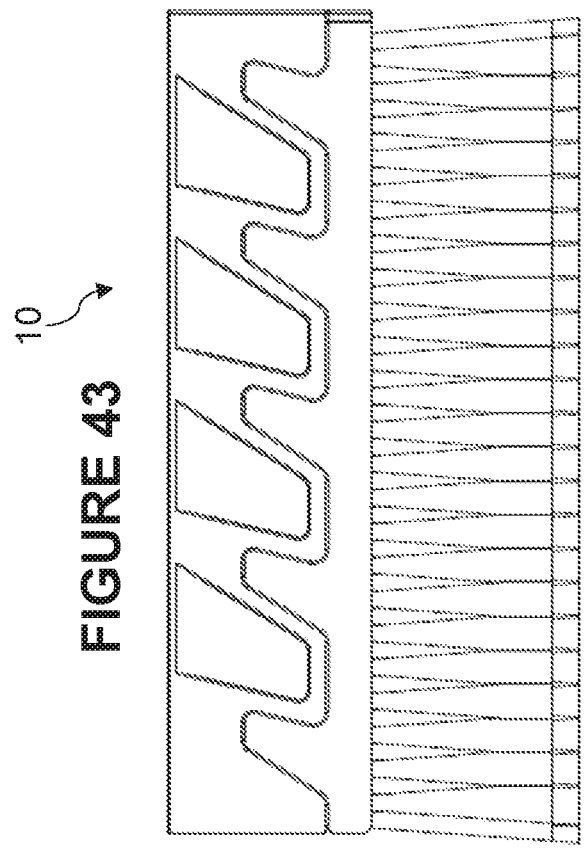
Figure 46:
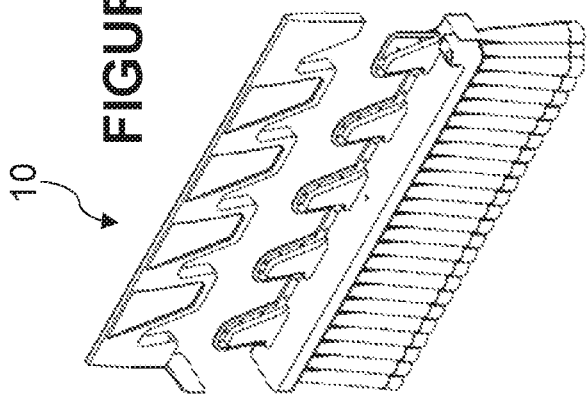
FIGS. 45-49 are a front perspective view, a rear perspective view, a front view, a side view and a rear view of the isolated portion of FIGS. 41-44, in exploded views.
Figure 49:
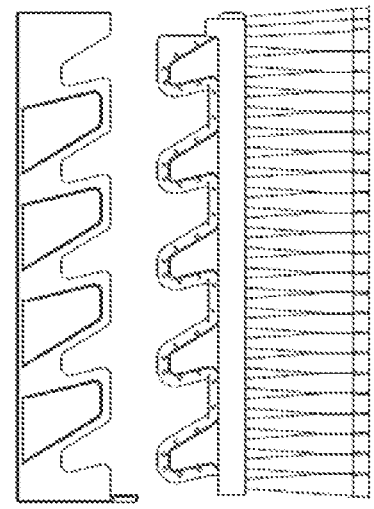
Figure 45:
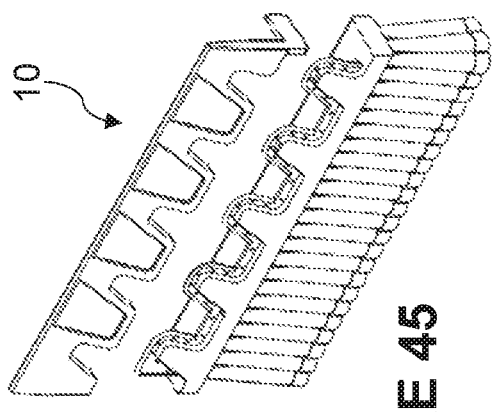
Figure 48:
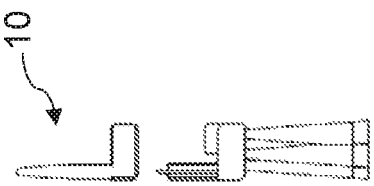
Figure 47:
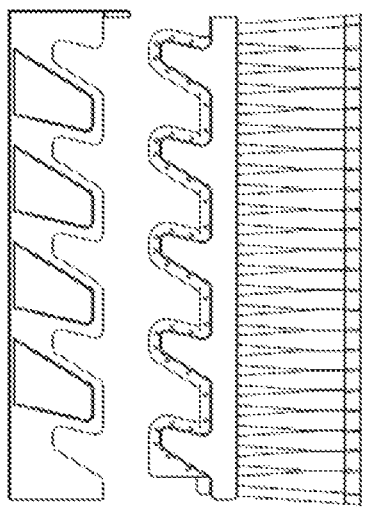
Figures 50, 51:
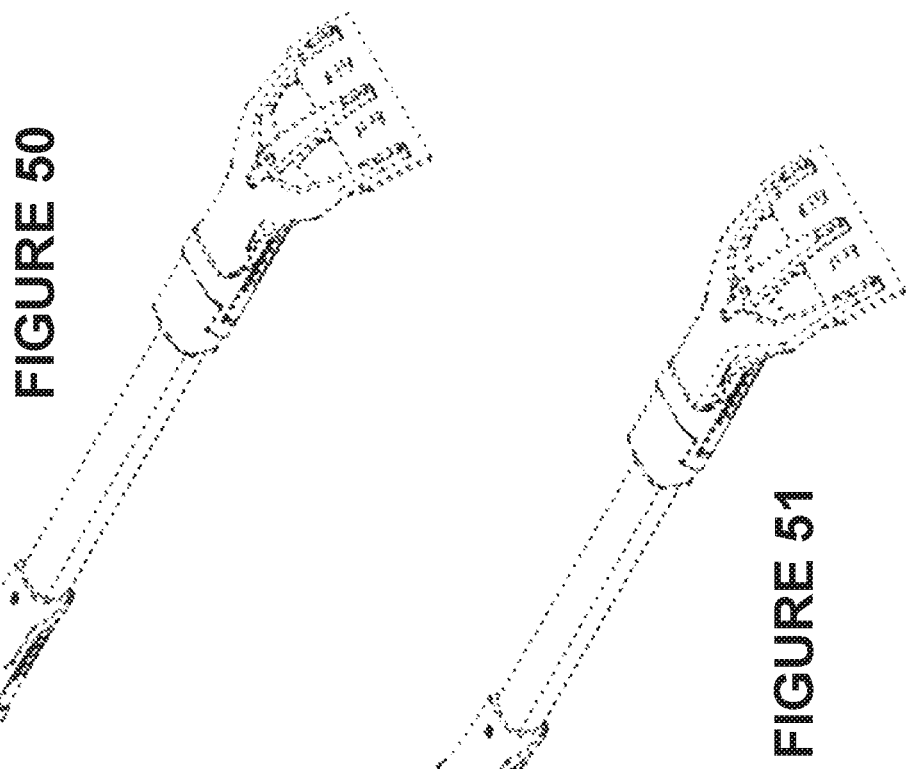
FIG. 50 is a perspective view illustrating another embodiment of the snow-removal tool 10, in a first position.
FIG. 51 is an exploded perspective view of the tool of FIG. 50.
Figure 54:
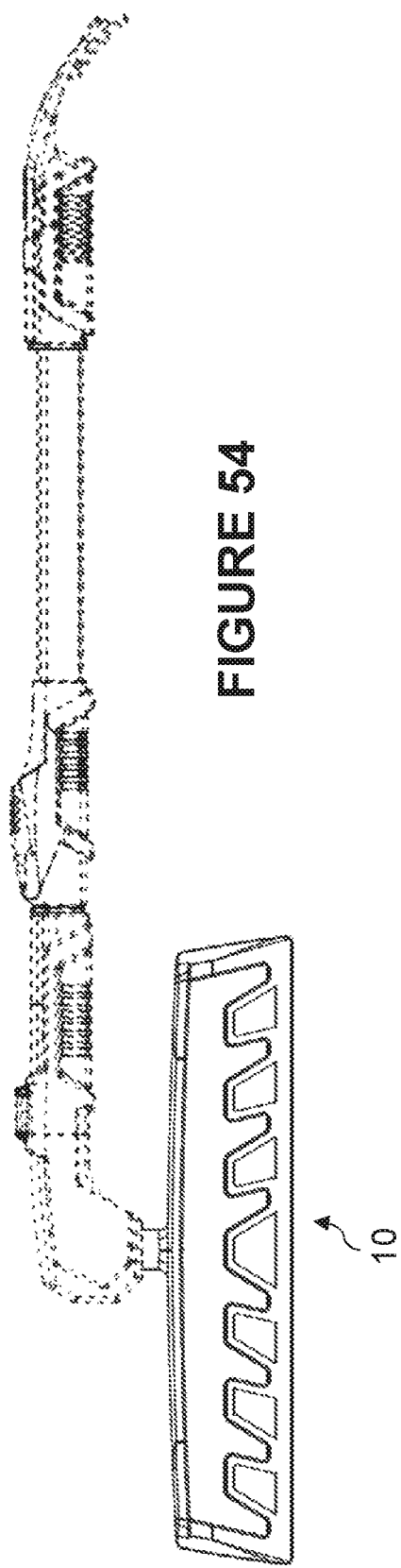
FIG. 54 is a side view of the tool of FIG. 50.
Figure 55:
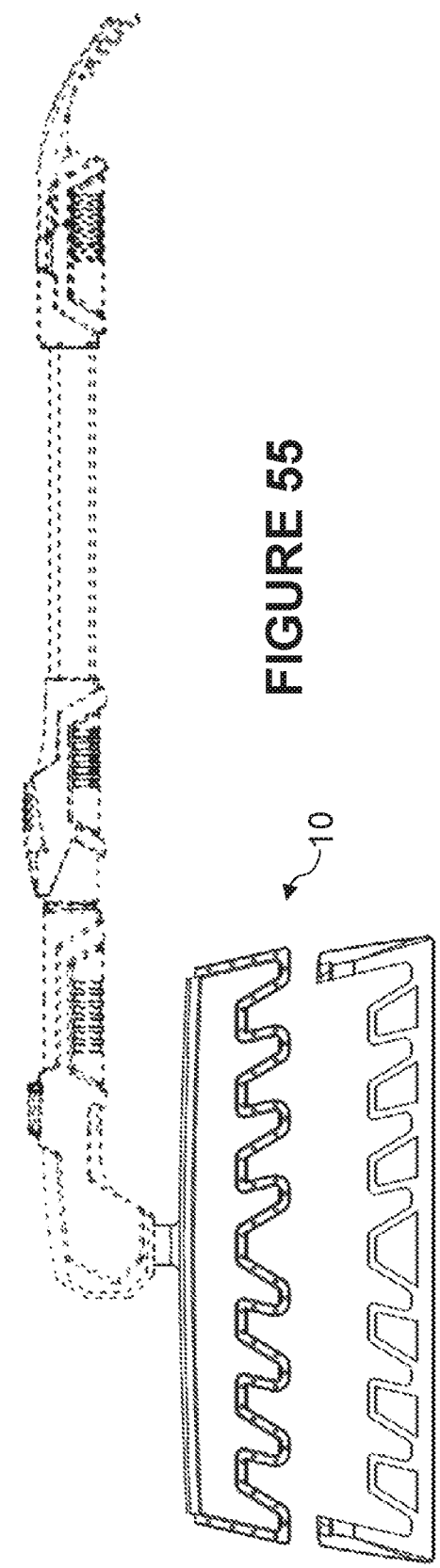
FIG. 55 is an exploded side view of the tool of FIG. 50.
Figure 56:
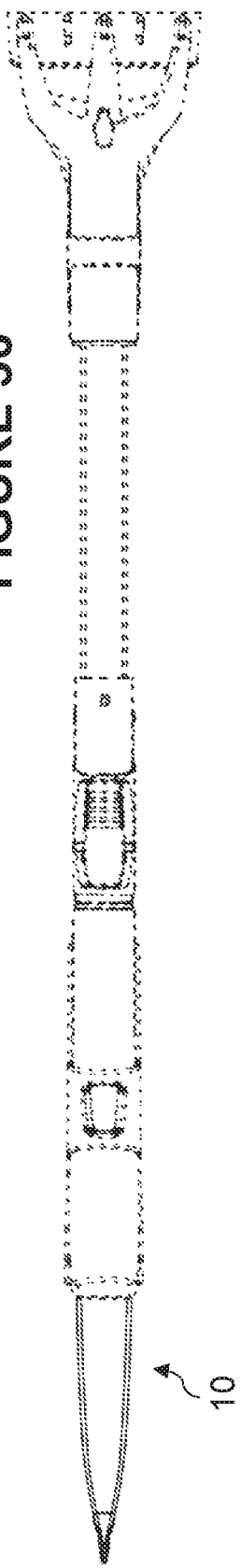
FIG. 56 is a top view of the tool of FIG. 50.
Figure 57:
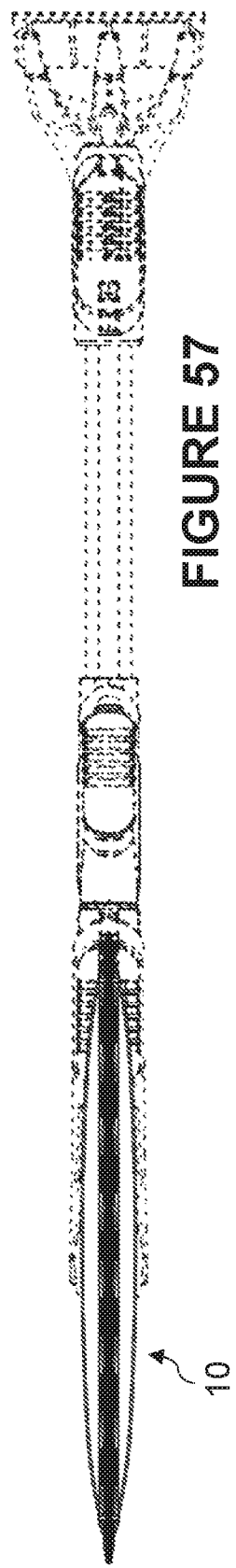
FIG. 57 is a bottom view of the tool of FIG. 50.
Figure 59:
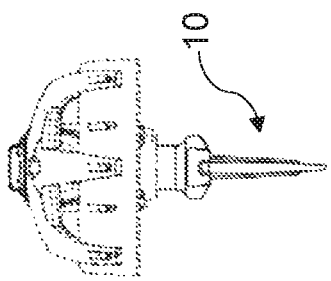
FIG. 59 is a rear view of the tool of FIG. 50.
Figure 58:
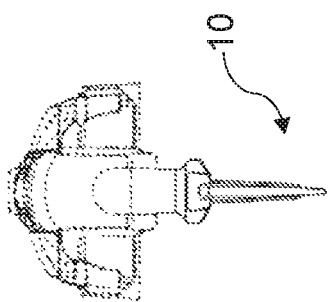
FIG. 58 is a front view of the tool of FIG. 50.
Figure 60:
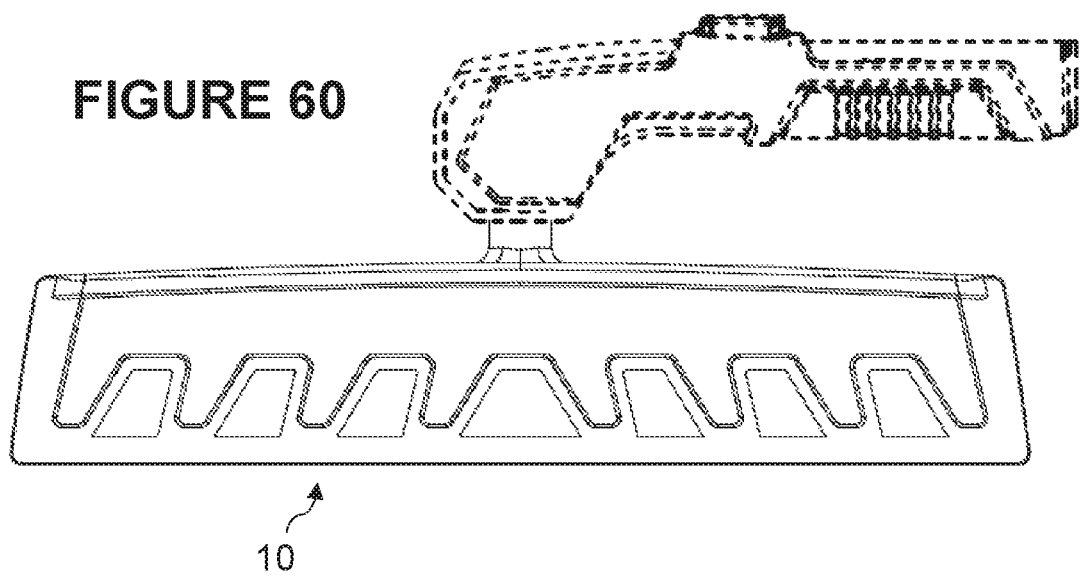
FIG. 60 is a side, see-through view of the tool of FIG. 50.

Now referring to a different aspect of the invention, one may remark that during use, the tool 10 as described can be advantageously manipulated as a squeegee. Having regard to the embodiment shown in FIGS. 1-5, this implies that during use, the hand will hold the handle and sweep the blade 20 transversally, to perform a movement on the car surface similar to a car wiper. When sweeping a vertical car window, one can expect that the hand of the user will hit the window, leading to a lack of comfort and causing a limitation in what would be the natural movement for using the tool 10. In order to avoid this problem, the tool 10 should be shaped to have the handle be further from the window during use. This can be done be making the blade 20 larger (either on its whole length or only differentially larger at a proximal portion of the blade), or by adding a transversal offset to the handle, which is then S-shaped or Z-shaped to have the handle portion, as shown in FIG. 20, where the hand is placed, distanced from the surface being swept. In FIG. 21, the blade is shown as being larger at a proximal portion, by having the proximal corner 121 more transversely distant from the blade support 30 than the distal corner 122. This further gives an inclination to the straight line of the bottom edge 21 (or, as mentioned earlier, an embodiment can include a combination of an S- or Z-shaped handle and an inclined bottom edge 21).

According to another embodiment, the extremal ones of the plurality of periodic rigid members can be longer/larger than the non-extremal ones. For example, among the plurality of rigid members, the most proximal one of the plurality of rigid members can be longer than those which are not extremal. The most distal one of the plurality of rigid members can also be longer/larger than those which are not extremal. This particularity can apply to any one of the distal or proximal rigid members, or to both at the same time. Proximal is defined as being longitudinally closer to the handle, and distal is defined as being longitudinally farther from the handle. The comparatively greater length of at least one of the extremal rigid members refers to the length as measured, starting from the blade support 30 toward the edge of the blade 20 and up to the tip of the rigid member which is away from said blade support 30. In an embodiment, the most distal rigid member must be expanded (i.e., longer/larger) to provide more strength underneath the lateral edge 23 of blade 20 because this area may be solicited to clean trimmings, mirrors and wiper gutters.

Having a longer rigid member at a proximal end and/or at a distal end of the flexible blade 20 is useful in that it reinforces the proximal end 121 and/or distal end 122, which can withstand greater forces when being applied onto a surface to clean. The corner at the proximal end 121 and the corner at the distal end 122 are more vulnerable to bending forces (i.e., those which can deform the flexible material in the z-direction) which can make the corners more prone to tearing or other undesirable mechanical failures. The farther the flexible-material corner extends away from the tip of the extremal rigid member, the more the corner is vulnerable to such mechanical stresses. By having said tip extend longer than the other ones, the corners have a smaller free length for bending and this prevents significant bending. The corners are therefore less vulnerable to bending forces and can have an increased lifetime. During use, the corners can also be slightly more rigid than the remainder of the flexible blade, which can be useful for softly scraping less accessible areas of the car.

For a similar reason, the flexible material can also extend along a distal edge of the tool 10, as shown in FIGS. 20-27, for example. More particularly, FIG. 21 shows that a second continuous sweeping edge 125 is provided at the distal end of the tool 10, allowing sweeping small and/or hardly accessible areas, such as the mirrors. The flexible material can be continuous, starting from main portion forming the blade 20 and then following the contour of the blade support 30 past the distal corner 122 of the blade and reaching an upper distal end 123 to form a second edge 125 on the distal end, substantially perpendicular to the main edge 21 of the blade.

FIGS. 23-31B are different views illustrating a design of an embodiment of the snow-removal tool 10. The comments made regarding FIGS. 1-5 are generally applicable to FIGS. 23-31B.

FIGS. 32-49 are different views illustrating a design of another embodiment of the snow-removal tool 10. The comments made regarding FIGS. 6-14 are generally applicable to FIGS. 32-49.

Figure 61:
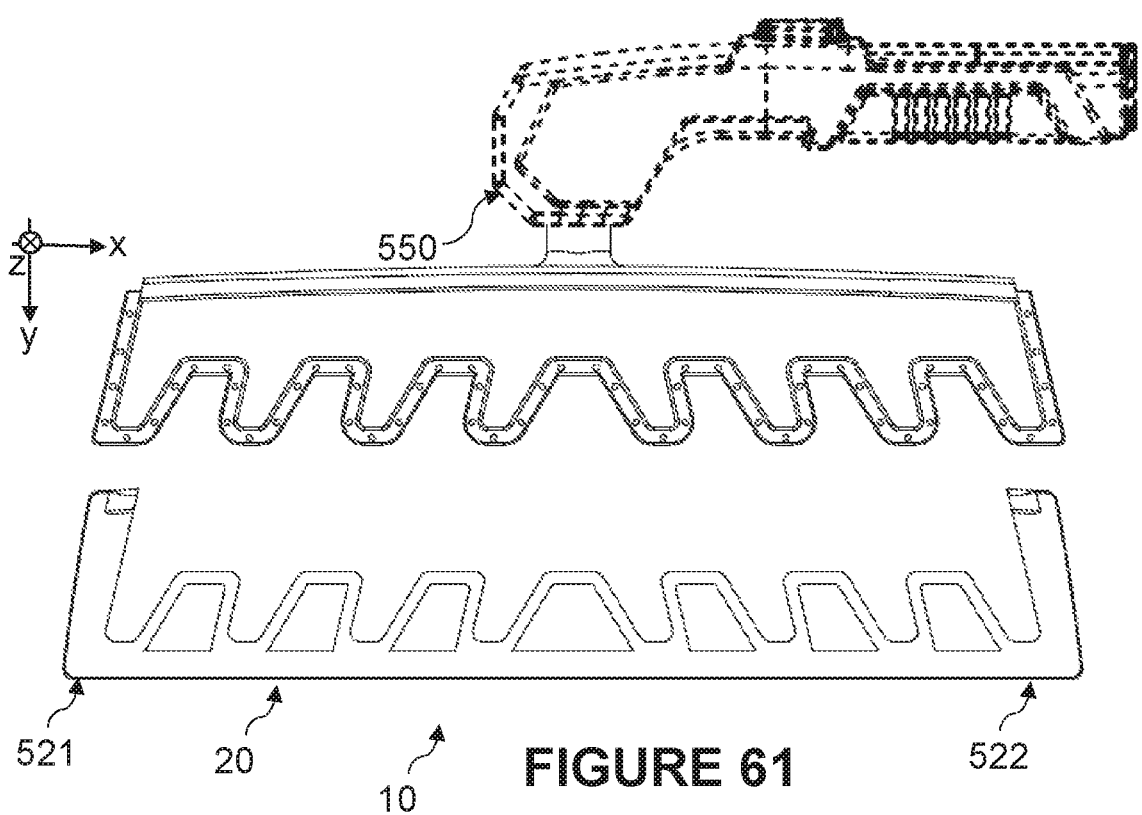
FIG. 61 is a side, see-through, exploded view of the tool of FIG. 50.

FIGS. 50-64 are views of another embodiment of the tool 10, where the tool 10 is similar to the one shown in FIGS. 15-17, but in which the blade support comprises a joint 510 (see FIG. 63) which can be fitted into a socket 550 (see FIG. 61) for three-dimensional pivoting. Using a locking arrangement as known in the art, one can then releasably lock the tool 10 in different angular positions with respect to the handle. Example of multi-axis locking and movement of articulated tools on a brush or scraper apparatus can be found, for example, in U.S. Pat. No. 9,107,490, incorporated herein by reference, and can involve pins and recesses for locking the joint 510 inside the socket 550 in different angular positions. In this embodiment, as shown in FIG. 61, the tool 10 comprises a single blade extending longitudinally in the x-axis as shown from a first corner 521 to a second corner 522, and the sweeping edge 20 forming a straight line therebetween (could be another shape if needed such as a slight curve depending on the target surface).

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A snow removal tool comprising:
   a flexible blade presenting a sweeping surface extending in a plane, the flexible blade defining a blade edge which is continuous; and
   a plurality of fingers which are more rigid than the flexible blade and extend, in the plane of the sweeping surface, toward the blade edge without reaching the blade edge.

2. The snow removal tool of claim 1, wherein the flexible blade is made of silicone.

3. The snow removal tool of claim 1, wherein the flexible blade is made of thermoplastic elastomer.

4. The snow removal tool of claim 1, further comprising a blade support from which the plurality of fingers extends.

5. The snow removal tool of claim 4, wherein the blade support is made of any one of polypropylene, polycarbonate, polyethylene and ABS.

6. The snow removal tool of claim 4, wherein at least a portion of the plurality of fingers are integral with the blade support from which they extend.

7. The snow removal tool of claim 6, wherein the at least a portion of the plurality of fingers integral with the blade support are made of said any one of polypropylene, polycarbonate, polyethylene and ABS, of which the blade support is made.

8. The snow removal tool of claim 7, wherein all of the plurality of fingers are integral with the blade support from which they extend.

9. The snow removal tool of claim 8, wherein the blade support and the plurality of fingers comprise an inner slot extending in a longitudinal direction and the flexible blade is secured to the blade support and to the plurality of fingers by sliding an upper portion of the flexible blade into the inner slot.

10. The snow removal tool of claim 4, wherein the blade support comprises only a single flexible blade, namely the flexible blade.

11. The snow removal tool of claim 1, wherein the sweeping surface of the flexible blade has an upper edge which conforms to a contour of the fingers.

12. The snow removal tool of claim 11, wherein the contour of the fingers comprises a border for securing the flexible blade thereto.

13. The snow removal tool of claim 12, wherein the border of the fingers is pierced with apertures and the flexible blade is overmolded over the border of the fingers and through the apertures for securing the flexible blade thereto.

14. The snow removal tool of claim 13, wherein the border of the fingers is thinner than a remainder of the fingers such that the flexible blade is overmolded over the border of the fingers for securing the flexible blade thereto, but not overmolded over the remainder of the fingers.

15. The snow removal tool of claim 1, wherein the flexible blade is made of silicone or thermoplastic elastomer, and the plurality of fingers are provided as a longitudinally periodic thickening of the silicone or thermoplastic elastomer, the periodic thickening being thicker in comparison with a remainder of the flexible blade between the longitudinally periodic thickening.

16. The snow removal tool of claim 1, wherein the flexible blade has a proximal corner and a distal corner, and the blade edge is continuous along a straight line from the proximal corner to the distal corner.

17. The snow removal tool of claim 16, further comprising a second continuous sweeping edge extending upwardly from the distal corner.

18. A snow brush apparatus comprising the snow removal tool of claim 1.

* * * * *